United States Patent
Kawano

(10) Patent No.: US 6,480,302 B1
(45) Date of Patent: Nov. 12, 2002

(54) IMAGE PROCESSING APPARATUS AND IMAGE PROCESSING METHOD

(75) Inventor: Hiroyuki Kawano, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/263,632

(22) Filed: Mar. 5, 1999

(30) Foreign Application Priority Data

Mar. 26, 1998 (JP) .......................................... 10-079526

(51) Int. Cl.[7] .......................... G06K 15/02; G06T 5/00; H04N 1/409
(52) U.S. Cl. ...................... 358/2.1; 358/3.21; 358/3.27; 382/199; 382/264
(58) Field of Search ................................ 358/1.9, 1.11, 358/462, 456, 298, 2.1, 3.21, 3.24, 3.27; 382/173, 176, 199, 237, 261, 264

(56) References Cited

U.S. PATENT DOCUMENTS

| 4,847,641 A | 7/1989 | Tung | |
|---|---|---|---|
| 5,455,681 A | 10/1995 | Ng | .............................. 358/298 |
| 5,659,402 A | * 8/1997 | Fujita et al. | ................ 358/462 |
| 6,006,013 A | * 12/1999 | Rumph et al. | ................ 358/1.5 |
| 6,256,104 B1 | * 7/2001 | Rumph et al. | ................ 358/1.9 |
| 6,327,043 B1 | * 12/2001 | Rumph et al. | ................ 358/1.9 |

FOREIGN PATENT DOCUMENTS

| JP | 7-232463 | 9/1995 |
|---|---|---|
| JP | 8-23446 | 1/1996 |
| JP | 8-139918 | 5/1996 |

* cited by examiner

*Primary Examiner*—Scott Rogers
(74) *Attorney, Agent, or Firm*—Oliff & Berridge, PLC

(57) ABSTRACT

The image processing apparatus is arranged by an object tag adding unit 11 for producing an object tag indicative of a sort of an object and a region, which are contained in an input image represented by input image data; a halftone screening unit 13 and a smoothing processing unit 14, which perform a predetermined conversion for image data identical to the input image data; and a selecting unit 16 for inputting thereinto the respective output image data from the halftone screening unit 13 and the smoothing process unit 14, and the image data identical to the input image data, and further the object tag. Based upon this object tag, this selecting unit 16 selects one image data from the input image data, and then produces an image forming control signal used to execute the image forming process operation based on the selected image data.

18 Claims, 20 Drawing Sheets

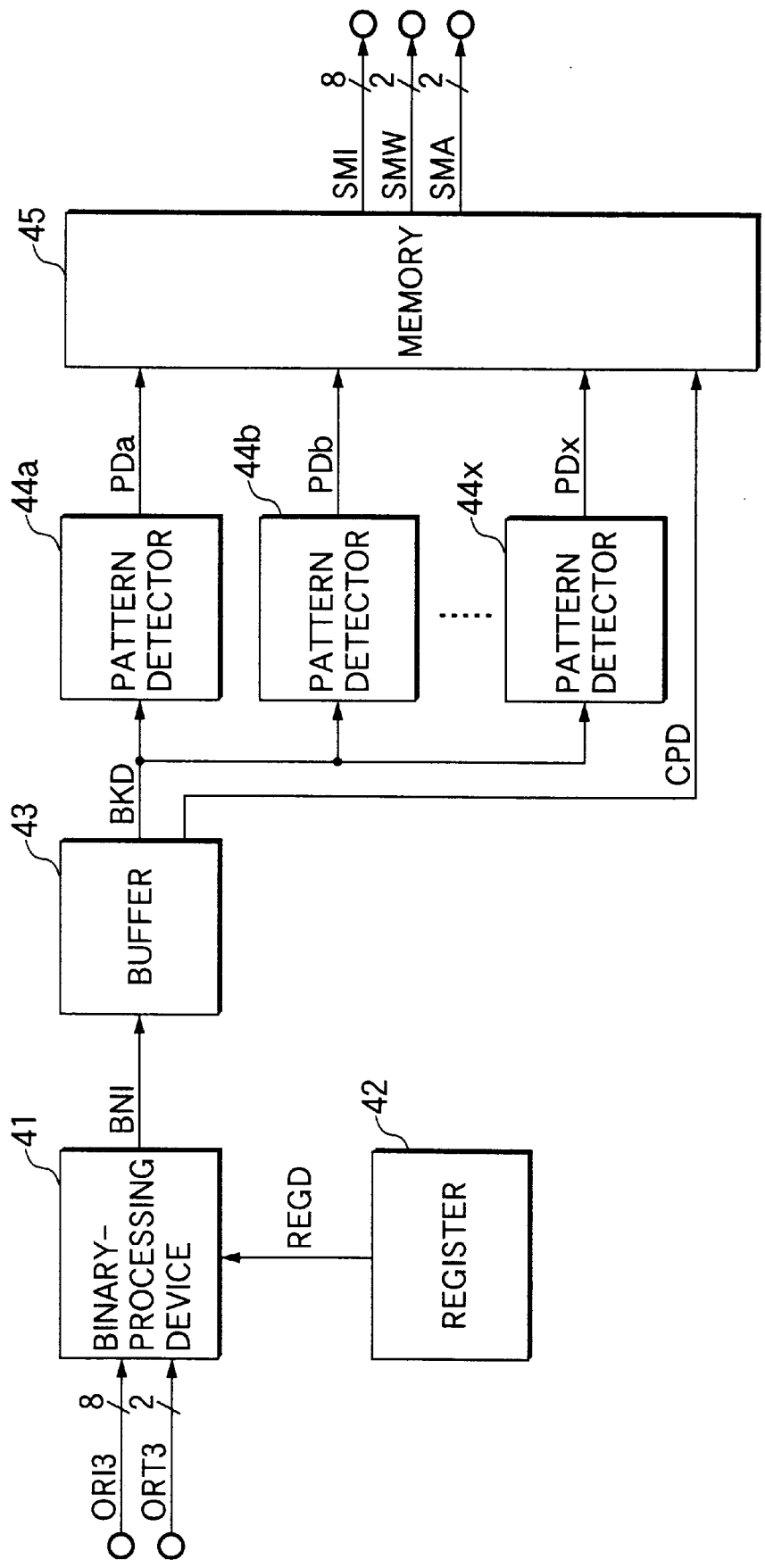

- ☐ 3Fh
- ▨ 7Fh
- ▨ BFh

- ☐ 00b
- ▨ 01b
- ▨ 10b

- ☐ 11b
- ☐ 00b
- ☐ 01b
- ☐ 10b

- ☐ 000b
- ▨ 100b
- ▨ 101b
- ☐ 110b
- ☐ 111b

- ☐ 3Fh
- ▨ 7Fh
- ▨ BFh

▨ 3Fh
■ 7Fh

☐ 00b
▨ 01b
▨ 10b

■ 11b
☐ 00b
▤ 01b

IMAGE PROCESSING APPARATUS AND IMAGE PROCESSING METHOD

BACKGROUND OF THE INVENTION

The present invention relates to an image processing apparatus and an image processing method, and more specifically, to an image processing apparatus and an image processing method, which converts an input image and also generates a control signal used to control an image forming operation every pixel with respect to this input image.

A conspicuous development has been made in high resolution of recent printers. For instance, in electro-photographic type printers, the resolution of 600 dpi could be realized in the main scanning direction, and also the resolution of 600 dpi could be realized in the sub-scanning direction. However, even in such a printer having the above-explained high resolution, there is a shortage of another resolution required to print out characters and line drawings in a smooth manner. As a result, for instance, as disclosed in U.S. Pat. No. 4,847,641 and the Unexamined Japanese Patent Application Publication No. Hei 8-23446, the technique for expanding the resolution (so-called "smoothing process technique) has been conducted into the electronic-photographic type printer. In this smoothing process technique, the dimension of the pixel to be formed is varied based upon the pattern matching result between the shape of the input image within a block having a certain dimension and the specific pattern. On the other hand, in order to improve the gradation characteristic of photographs/graphics, such a halftone screening operation as the dither processing operation, or the error diffusion process operation has been employed in general-purpose printers.

In documents printed out by printers, there are many possibilities that both photographs/graphics and characters/line drawings are mixed with each other within 1 page. When only the smoothing process operation is carried out with respect to such a document to print these smooth-processed document, the gradation characteristics of the photographs/graphics would be deteriorated. Conversely, when only the area gradation process operation is carried out with respect to such a document, the characters/line drawings could not be printed out in the smooth manner.

To solve this problem, for example, the Unexamined Japanese Patent Application Publication No. Hei 8-139918 describes the method for switching the smoothing process operation and the halftone screening operation based on the comparison result between the pixel value of the input image and the threshold value. Also, the Unexamined Japanese Patent Application Publication No. Hei 7-232463 discloses such a method that the feature is extracted from the data (will be referred to as "PDL data" hereinafter) described by the page description language (will be referred to as a "PDL" hereinafter), the input image of 1 page is subdivided into a plurality of regions in accordance with the extracted feature, and then the content of the processing operation for the input image is changed every region. In accordance with this method, for example, the content of the halftone screening operation is varied with respect to each of the regions, and also the smoothing process operation is carried out only for the region of the black character.

However, in the above-explained two smoothing process methods, since the smoothing process operation is carried out based upon the result of the pattern matching operation, even in such an area which is wanted to be processed by the smoothing process operation, if there is no pattern made coincident with this area, then no smoothing process operation is carried out. Conversely, even in such an area which is not wanted to be processed by the smoothing process operation, if there is a pattern made coincident with this area, then the smoothing process operation is carried out.

As a method for capable of solving such a problem, for instance, U.S. Pat. No. 5,455,681 discloses the below-mentioned method. That is, the PDL data is once rasterized by higher resolution than that of the printer, the binary image obtained by rasterizing the PDL data is converted into the multi-valued image having the same resolution as that of the printer, and also, the information indicative of the shift direction of the pixel is added to each of the pixels of the multi-valued image obtained after the conversion. Based on both the multi-valued image and the added information, the printing operation of the pixel is controlled. In accordance with this method, the above-described problem caused by the smoothing process operation by the above-described pattern matching method can be solved, so that the characters and line drawings can be more smoothly printed out. However, this method owns a drawback that when the photographs/graphics are printed by using this print control method, the gradation characteristics thereof would be deteriorated.

SUMMARY OF THE INVENTION

The present invention has been made to solve the above-described problems, and therefore, has an object to provide an image processing apparatus and an image processing method, capable of improving image qualities of document images involving various sorts of regions.

To solve the above-described problems, an image processing apparatus, according to the present invention, is featured by comprising: an object tag producing unit for producing an object tag indicative of a sort of an object and also a region of the object contained in an input image represented by an input image data; an image converting unit for converting the input image data to produce converted image data; and a control signal producing unit for inputting thereinto the object tag produced by the object tag producing unit, for selecting any one of the input image data and the converted image data produced by the image converting unit based upon the inputted object tag, and for producing a control signal used to perform an image forming process operation based on the selected image data. As a consequence, the control signal used to perform the image forming process operation is produced based upon the more proper image data selected from the input image data and the converted image data every object contained in the input image. Alternatively, in the above-described arrangement of the image processing apparatus, while a plurality of image converting units may be employed, another control signal used to perform the image forming process operation may be produced based upon the most proper image data selected from a plurality of image converted data and the input image data.

Also, to solve the above-explained problems, an image processing method, according to the present invention, is featured by comprising: an object tag producing step for producing an object tag indicative of a sort of an object and a region of the object contained in an input image expressed by an input image data; an image converting step for converting the input image data to produce at least one converted image data; and a control signal producing step for selecting any one of the input image data and the at least one converted image data produced at the image converting step, and for producing a control signal used to perform an image forming process operation based upon the selected image data. As a consequence, the control signal used to execute the image forming process operation is produced based on the most proper image data selected from the input image data and at least one converted image data every object contained in the input image.

BRIEF DESCRIPTION OF THE DRAWINGS

FIG. 4 is a diagram for indicating a structural example of a smoothing process unit 14 contained in the image processing apparatus.

DETAILED DESCRIPTION OF THE PREFERRED EMBODIMENTS

Figure 1:
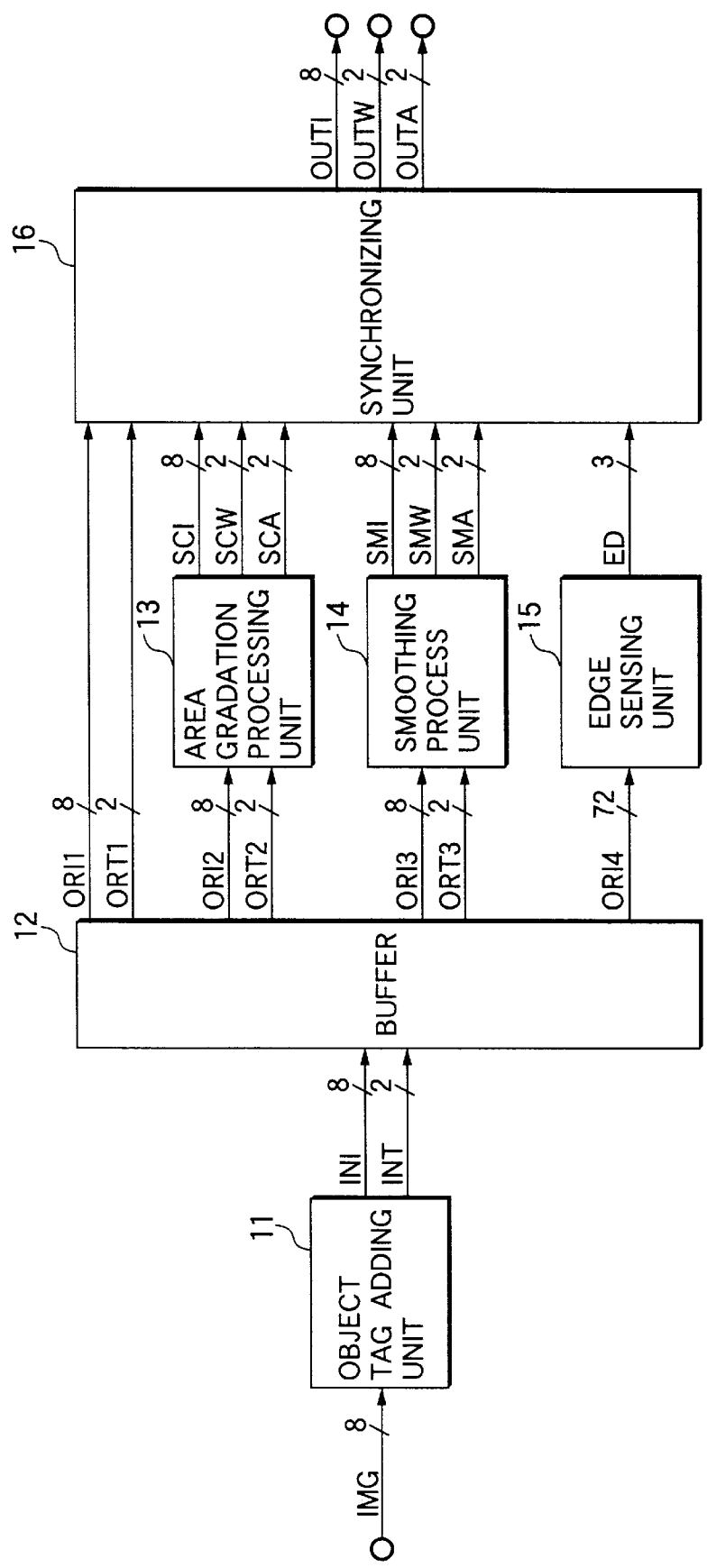
FIG. 1 is a diagram for indicating a structural example of an image processing apparatus according to an embodiment of the present invention.

Referring now to drawings, various embodiment modes of the present invention will be described. It is now assumed in the following description of this embodiment mode that an input image to be processed is a gray scale image containing 8-bit gradation information per 1 pixel. Also, it should be understood that a numeral value in which symbol "b" is added to a final value is a numeral value of a binary representation, a numeral value in which symbol "h" is added to a final value is a numeral value of a hexadecimal representation, and a numeral value to which no symbol is added is a numeral value of a decimal representation. Furthermore, in FIG. 14 to FIG. 16, a rectangular shape indicates a pixel, a white rectangular shape represents a white pixel, a black rectangular shape shows a black pixel, and as to rectangular shapes with other patterns, these shapes are defined in accordance with remarks described in the drawings, or described later.

A: ARRANGEMENT

FIG. 1 schematically shows an arrangement of an image processing apparatus (will be referred to as a "present apparatus" hereinafter) according to an embodiment mode of the present invention. In this drawing, reference numeral 11 shows an object tag adding unit. The object tag adding unit 11 inputs thereinto image data IMG from an external appliance, and adds an object tag (will be discussed later) to this image data so as to output the image data with the object tag. Reference numeral 12 is a buffer. The buffer 12 inputs thereinto the image data INI outputted from the object tag adding unit 11 and the object tag INT so as to buffer the image data INI and the object tag INT, and outputs these image data and object tag at timing in response to a process operation executed in the post stage.

Reference numeral 13 shows a halftone screening unit. The halftone screening unit 13 inputs thereinto both the image data ORI2 and an object tag ORT2, which are outputted from the buffer 12, and performs a halftone screening operation based upon the object tag ORT2 with respect to this image data ORI2 to thereby the area-gradation-processed image data and an image forming control signal (will be discussed later) Reference numeral 14 represents a smoothing process unit 14. The smoothing process unit 14 inputs thereinto both the image data ORI2 and the object tag ORT2, which are outputted from the buffer 12, and also executes a smoothing process operation based on the object tag ORT2 with respect to this image data to thereby output the smoothing-processed image data and an image forming control signal. Reference numeral 15 shows an edge detecting unit. The edge detecting unit 15 inputs thereinto 3×3 block image data ORI4 outputted from the buffer 12, and also senses as to whether or not a pixel of interest within an image expressed by this image data corresponds to a pixel which constitutes a contour (will be referred to as an "object" hereinafter) of an object such as characters/line drawings and photographs/graphics. Also, this edge detecting unit 15 senses a direction of this edge to thereby output an edge detecting result.

Reference numeral 16 indicates a selecting unit. The selecting unit 16 inputs thereinto both the image data ORI1 and object tag ORT1 outputted from the buffer 12; both the image data SCI and image forming control signals SCW/SCA outputted from the halftone screening unit 13; both the image data SMI and image forming control signals SMW/SMA outputted from the smoothing process unit 14; and further the edge detecting result ED outputted from the edge detecting unit 15. Then, the selecting unit 16 outputs image data OUTI, and image forming control signals OUTW/OUTA.

Next, functions of the respect circuit units will now be explained in accordance with data flows.

The image data IMG inputted into the present apparatus is first inputted into the object tag adding unit 11. The object tag adding unit 11 performs no processing operation for the input image data IMG to output this non-processed image data as image data INI, and also analyzes the image data IMG in unit of a pixel so as to obtain a classification result thereof. As exemplified in table 1, this classification result is outputted as 2-bit information (object tag INT).

TABLE 1 a corresponding relationship between the classification and the object tag:

| classification | object tag |
| --- | --- |
| multi-valued-rasterized character | 00b |
| photograph | 01b |
| graphics | 10b |
| binary-rasterized character | 11b |

It should be under-stood that as an image classifying method executed in the object tag adding unit 11, if the items can be classified as indicated in the above-explained table 1, any classifying methods may be employed. In this case, as to all pixels existed in a rectangular region having a predetermined size in which a pixel of interest is located at a center, after a weighting process operation is carried out in accordance with distances separated from the pixel of interest, a statistical processing operation is carried out. Based upon this result (for example, a shape of a histogram of pixel numbers with respect to gradation), this pixel of interest is classified. For instance, in such a case that the pixel of interest corresponds to a pixel constituting a binary-rasterized character, such a histogram is obtained. That is, this histogram represents that a pixel number with respect to specific gradation becomes conspicuous, which may specify a sort of a pixel of interest.

Now, a description will be made of a "binary-rasterized character" and a "multi-valued-rasterized character".

Usually, a character is expressed by a code indicative of such a character to be printed out, information representative of a sort of a font, and also information indicative of a dimension (size) of the character. Then, in a stage for forming a printed image, the following process operation is carried out. That is, font data is read out, and the read font data is converted into a dimension corresponding to the information about the above-described dimension of character. This font data corresponds to both the code indicative of the character to be printed out, and also the information representative of the sort of the font. It should also be understood that a font may be mainly classified into a bit map font and an outline font (vector font). The bit map font indicates all of characters as a raster image, whereas while a contour of a character is recognized as a set of lines, a character is expressed by drawing information about these lines. Since the deforming process operation with less defect can be readily carried out, the "outline font" may constitute the major print image forming process operation. As a consequence, the present image processing apparatus uses only the outline font in this embodiment.

Since font data of an outline font corresponds to drawing information in either a virtual coordinate space or a coordinate space corresponding to specific resolution, the font data is required to be converted into such drawing information in a coordinate space corresponding to actually printed resolution and dimension. Also, in such a case that a character such as a bold character whose printing weight is different from that of the standard character, and also another character such as an italic character that the standard character is decorated/modified, are printed out, the font data must be converted by considering these specific characters. The specific conversion is carried out for the font data by considering the above-described item, and the area inside the contour expressed by the font data is painted over, so that the raster image of the character to be printed out is obtained. Normally, since there are many possibilities that as to a printing color of a character, 1 color is employed of 1 character, the area within the contour is painted over with 1 color so as to obtain the raster image.

The raster image obtained in the above-described manner is referred to as a "binary-rasterized character" in this specification.

Figure 16A:
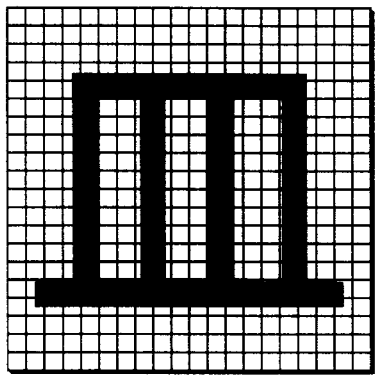
FIGS. 16A to 16F are diagram for showing a processing example of a multi-valued-rasterized character.
Figure 16B:
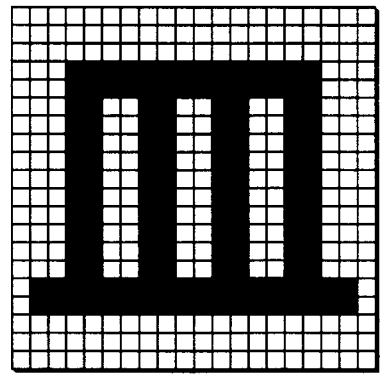
Figure 16C:
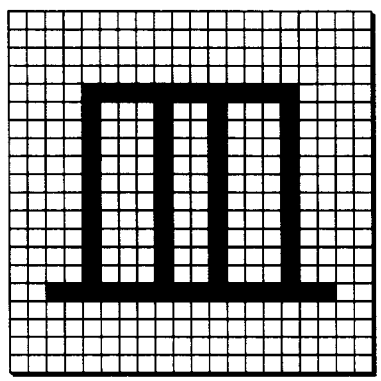

On the other hand, since precision of drawing information of an outline font is essentially higher than printing resolution, when being rasterized, an ideal image obtained from the drawing information is quantized. In other words, a quality of a raster image obtained by being rasterized would be deteriorated, as compared with a quality of such an ideal image. For instance, when such an ideal rasterized image as shown as a Chinese character of (means dishes) in FIG. 16A is quantized, this character would become such a raster image as indicated in FIG. 16B, or FIG. 16C.

Figure 16D:
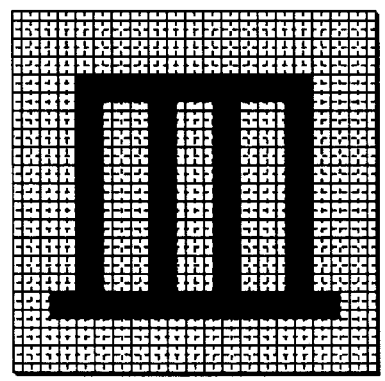
Figure 16E:
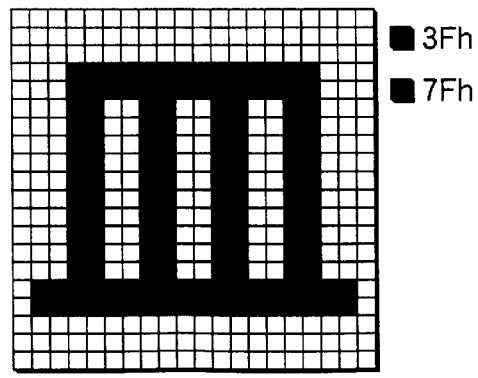
Figure 16F:
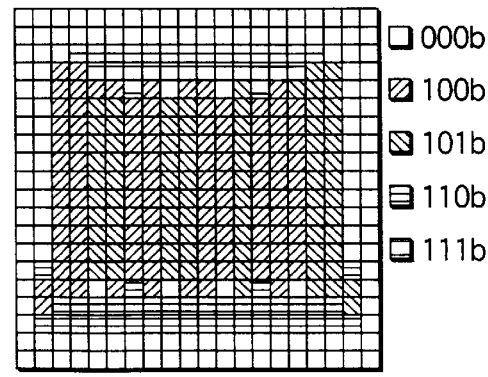

As a method for suppressing deterioration of image qualities caused by this quantization, there is such a method for resolution-converting a binary image which is obtained by rasterizing an image in higher resolution than printing resolution into a multi-valued image with the printing resolution. In this converting method, while the resolution conversion is carried out, a plurality of pixels of the raster image which is obtained by rasterizing the image in the higher resolution than the printing resolution are made in correspondence with one pixel in the printing resolution. For example, when the Chinese character shown in FIG. 16 is rasterized in resolution two times higher than the printing resolution, this character becomes such a raster image as shown in FIG. 16D. In the case that a block of FIG. 16D is resolution-converted by being converted into a pixel of a value corresponding to a total number of black pixels within this block, another raster image as shown in FIG. 16E is obtained. In this block, 2 pixels along the main scanning direction are not overlapped with 2 pixels along the sub-scanning direction. It should be noted in the resolution conversion of this embodiment that when 1 black pixel is present within the above-described block, this black pixel is converted into such a pixel having a pixel value of "3Fh"; when 2 black pixels are present within the above-explained block, these black pixels are converted into such a pixel having a pixel value of "7Fh"; when 3 black pixels are present within the above-explained block, these black pixels are converted into such a pixel having a pixel value of "BFh"; and when 4 black pixels are present within the above-explained block, these black pixels are converted into such a pixel having a pixel value of "FFh".

It should also be understood that the raster image obtained in the above-explained manner is referred to as a "multi-valued-rasterized character".

The image data INI and the object tag INT, which are outputted from the object tag adding unit 11 of FIG. 1 are buffered in the buffer 12 so as to be delay-adjusted. Thereafter, the delay-adjusted image data ORI2 and object tag ORT2 are supplied to the halftone screening unit 13; the delay-adjusted image data ORI3 and object tag ORT3 are supplied to the smoothing process unit 14; and also the delay-adjusted image data ORI1 and object tag ORT1 are supplied to the selecting unit 16. In conjunction with the above-described processing operation, in the buffer 12, such a block is formed from the image data INI outputted from the object tag adding unit 11. This block is constituted by 3 pixels along the main scanning direction and by 3 blocks along the sub-scanning direction (will be referred to as a "3×3 block" hereinafter). These block series are outputted as 3×3 block image data ORI4 to the edge detecting unit 15. It should be understood that a more concrete content of the delay adjustment executed in the buffer 12 will be discussed later.

In the halftone screening unit 13, the image data ORI2 derived from the buffer 12 is processed by way of the halftone screening operation based upon the object tag ORT2 outputted from the buffer 12, and then the processed image data ORI2 is outputted as image data SCI to the selecting unit 16.

As the method of this halftone screening operation, there are various methods such as the dither method and the error diffusion method. In the halftone screening unit 13, no process operation is carried out for the image data ORI2, and this image data is directly outputted as the image data SCI. Also, the halftone screening unit 13 alternately outputs as the image forming control signal SCW "01b" and 10b" in a sequential manner from a top of a line to be processed in the case that the number of this line to be processed is equal to the even number counted from the top line. The halftone screening unit 13 alternately outputs as the image forming control signal SCW "01b" and "10b" in the order reverse to that for the even-numbered line when the number of this line to be processed is equal to the odd number counted from the top line. Furthermore, the halftone screening unit 13 continuously outputs "11b" as the image forming control signal SCW. Also, when the object tag ORT2 is equal to a value indicative of a character (namely, when object tag is equal to either "00b" or "11b"), the halftone screening unit 13 directly outputs the image data ORI2 as the image data SCI; outputs "00b" as the image forming control signal SCW; and outputs "11b" as the image forming control signal SCA.

In the smoothing process unit 14, the image data ORI3 outputted from the buffer 12 is processed by the smoothing process operation based upon the object tag ORT3 derived from the buffer 12, and then the smoothing-processed image data is outputted as the image data SMI to the selecting unit 16. In this case, the smoothing operation by the smoothing process unit 14 will now be explained with reference to FIG. 4. FIG. 4 is a schematic block diagram for showing a structural example of the smoothing process operation 4. Reference numeral 41 indicates a binarizing device, reference numeral 42 shows a register for storing a threshold value used in the binarizing operation, reference numeral 43 represents a buffer, reference numerals 44a to 44x show pattern detectors, and also reference numeral 45 indicates a memory.

As to the image data ORI3 inputted into the smoothing process unit 14, only such a pixel (namely, pixel for constituting a multi-valued-rasterized character) whose object tag is equal to "00b" is binarized by the binarizing device 41, and then the binarized pixel is supplied to the buffer 43. The binarizing operation by the binarizing device 41 is realized in such a manner that the threshold value stored in the register 42 is compared with the pixel value of the image data ORI3; when the pixel value is larger than, or equal to the threshold value, this binarizing device 41 outputs "1"; and when the pixel value is smaller than this threshold value, the binarizing device 41 outputs "0". It should be understood that as to any pixel (namely, pixel which requires no smoothing process operation) whose object tag is any value other than "00b", this binarizing device 41 forcibly outputs "0".

The binarized image data inputted into the buffer 43 is buffered into this buffer 43 so as to be combined as a block image having a dimension of 5 pixels along the main scanning direction and of 5 pixels along the sub-scanning direction (will be referred to as a "5×5 block" hereinafter). This 5×5 block is outputted as 5×5 block image data BKD to the pattern detectors 44a through 44x. Also, a pixel value of a center pixel of this 5×5 block is outputted as center pixel data CPD to the memory 45. In the buffer 43, both the center pixel data CPD corresponding to this center pixel and the 5×5 block image data BKD are outputted every time the center pixel to be processed is shifted by 1 pixel along the main scanning direction. When there is no pixel to be processed along the main scanning direction, the pixel to be processed is shifted by 1 pixel along the sub-scanning direction, and also the process operation similar to the above-described process operation is repeatedly performed. In the above case, the pixel value of the center pixel of the 5×5 block is supplied to the memory 45. Alternatively the 5×5 block image data BKD may be supplied to the memory 45, and then the pixel value of the center pixel may be extracted in the memory 45.

Figure 5F:
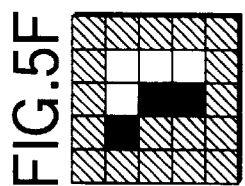
FIGS. 5A to 5X are diagram for representing one example of detection patterns used in pattern detectors 44a to 44x in the smoothing process unit 14.
Figure 5L:
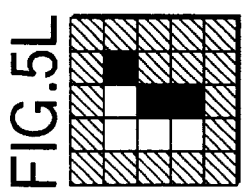
Figure 5R:
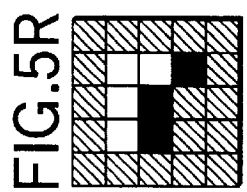
Figure 5X:
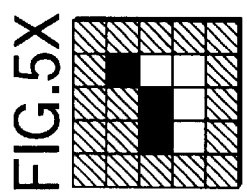
Figure 5E:
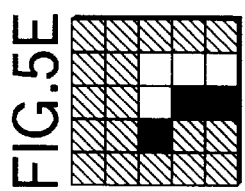
Figure 5K:
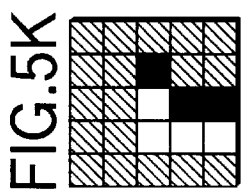
Figure 5Q:
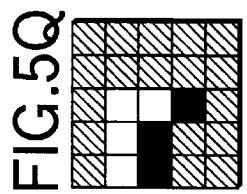
Figure 5W:
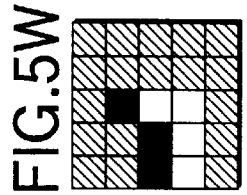
Figure 5D:
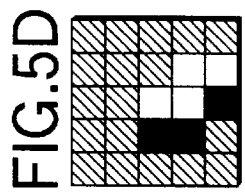
Figure 5J:
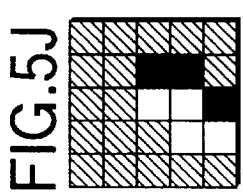
Figure 5P:
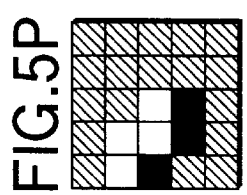
Figure 5V:
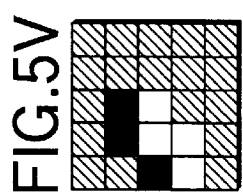
Figure 5C:
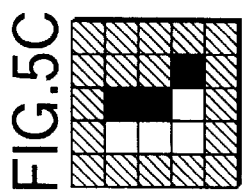
Figure 5I:
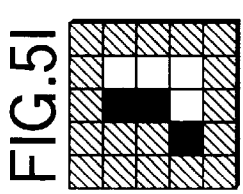
Figure 5O:
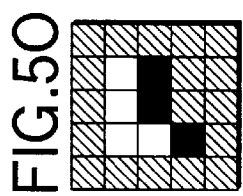
Figure 5U:
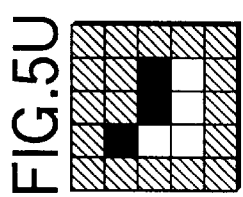
Figure 5B:
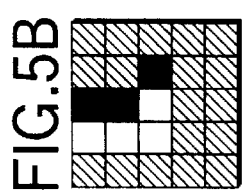
Figure 5H:
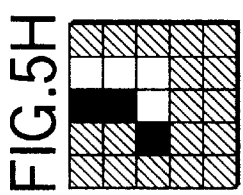
Figure 5N:
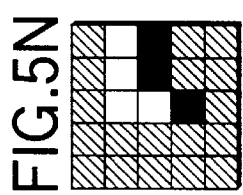
Figure 5T:
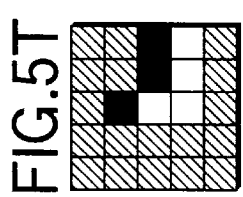
Figure 5A:
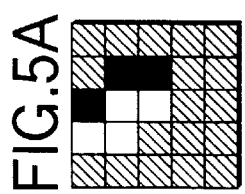
Figure 5G:
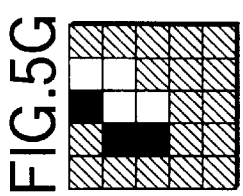
Figure 5M:
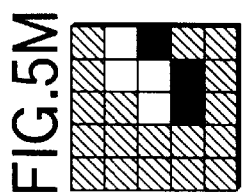
Figure 5S:
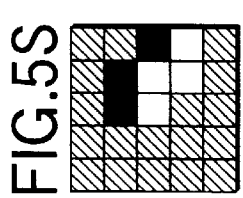

Each of the pattern detectors 44a to 44x compares the 5×5 block image data BKD derived from the buffer 43 with patterns shown in FIG. 5A to FIG. 5X, respectively. When the 5×5 block image data BLD is made coincident with any of these patterns of FIG. 5A to FIG. 5X, the pattern detectors 44a to 44x output detection signals PDa to PDx to the memory 45. It should be understood in the patterns of FIGS. 5A to 5X that a minimum rectangular shape indicates a pixel, a white rectangular shape represents such a pixel whose pixel value is equal to "0", a block rectangular shape denotes such a pixel whose pixel value is equal to "1" and a hatched rectangular shape represents such a pixel that the above-explained comparison is not carried out.

The memory 45 stores thereinto data corresponding to a lookup table (will be referred to as an "LUT" hereinafter) as indicated in a table 2. Referring to this LUT, the data corresponding to the pattern detection signals derived from the pattern detectors 44a to 44x and the center pixel data CPD inputted from the buffer 43 are read out from this LUT to be outputted. It should also be noted that in the table 2, symbol "SMI" indicates 8-bit image data representative of a pixel value, and symbols "SMW" and SMA" show 2-bit image forming control signals, respectively. For instance, when the pattern detection signal PDa is outputted from the pattern detector 44a, the value of the image data SMI outputted from the memory 45 becomes "63". Similarly, the image forming control signals SMW and SMA outputted from the memory 45 are "01b" and "11b", respectively.

TABLE 2

| | Output | | |
|---|---|---|---|
| | SMI | SMW | SMA |
| a | 63 | 01b | 11b |
| b | 127 | 01b | 11b |
| c | 191 | 01b | 11b |
| d | 63 | 10b | 11b |
| e | 127 | 10b | 11b |
| f | 191 | 10b | 11b |
| g | 63 | 10b | 11b |
| h | 127 | 10b | 11b |
| i | 191 | 10b | 11b |
| j | 63 | 01b | 11b |
| k | 127 | 01b | 11b |
| l | 191 | 01b | 11b |
| m | 63 | 00b | 00b |
| n | 127 | 00b | 01b |
| o | 191 | 00b | 10b |
| p | 63 | 00b | 00b |
| q | 127 | 00b | 01b |
| r | 191 | 00b | 10b |
| s | 63 | 00b | 00b |
| t | 127 | 00b | 01b |
| u | 191 | 00b | 10b |
| v | 63 | 00b | 00b |
| w | 127 | 00b | 01b |
| x | 191 | 00b | 10b | information producer. This edge information producer 62 inputs thereinto the filtering data FDa to FDd derived from the filters 61a to 61d, and then produces edge information data ED based upon these filtering data FDa to FDd and also an operation table shown in a table 3 to thereby output this edge information data ED.

TABLE 3

The operation table of the edge information producer 62.

It should also be understood that an index "priority order" indicated in the table 3 implies information for indicating which filter output is derived at a top priority when there are plural filters, the absolute filtering outputs of which are maximum.

A Condition
B Maximum of absolute value of output of a filter>a threshold value
C Maximum of absolute value of output of a filter≦a threshold value
D Filter outputting maximum value
E Priority order
F Sign (plus, minus)
G Edge information

TABLE 3

| A<br>条件 | | D<br>最大値出力フィルタ | E<br>優先順位 | F<br>正負 | G<br>エッジ情報 |
|---|---|---|---|---|---|
| B<br>フィルタ出力の絶対値の最大値>閾値 | | filter 71a | 1 | 正 | 100b |
| | | | | 負 | 101b |
| | | filter 71b | 2 | 正 | 101b |
| | | | | 負 | 100b |
| | | filter 71c | 3 | 正 | 110b |
| | | | | 負 | 111b |
| | | filter 71d | 4 | 正 | 111b |
| | | | | 負 | 110b |
| C<br>フィルタ出力の絶対値の最大値≦閾値 | | — | — | — | 000b |

In such a case that the 5×5 block image data BKD is not made coincident with any of the pattern (a) through the pattern (x) (namely, no pattern detection signal is outputted from all of pattern detectors 44a to 44x), the value of the image forming control signal SMW outputted from the memory 45 becomes "00b", and the value of the image forming control signal SMA becomes "11b". The value of the image data SMI may follow the below-mentioned rule. In other words, when the value of the binarized image data BNI outputted from the binarizing device 41 is equal to "1", the value of the image data SMI becomes "255". When the value of this binarized image data BNI is equal to "0", the value of the image data becomes "0".

In FIG. 1, the 3×3 block image data ORI4 inputted into the edge detecting unit 15 is utilized in the edge detecting process operation executed by the edge detecting unit 15.

Figure 6:
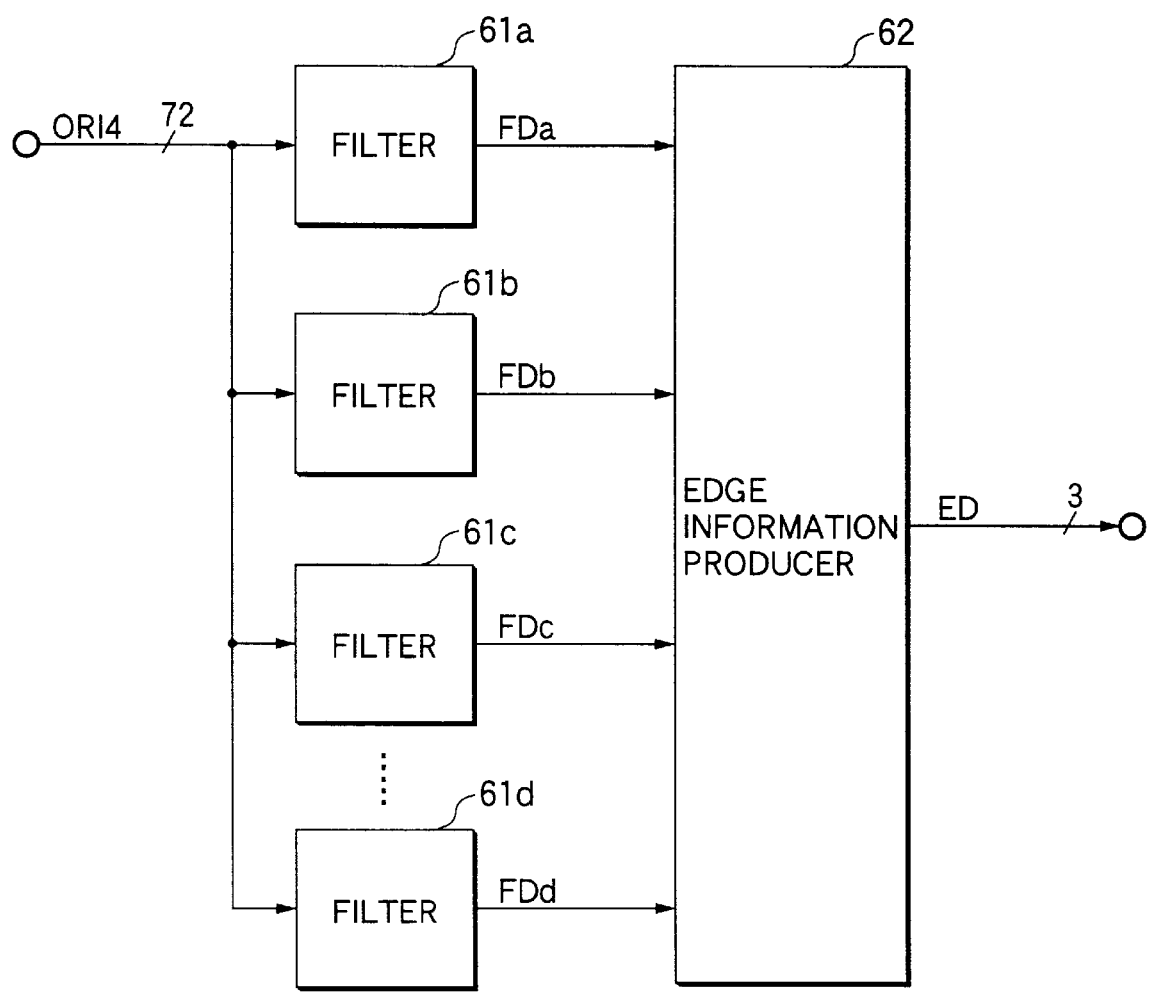
FIG. 6 is a diagram for showing a structural example of an edge detecting unit 15 contained in the image processing apparatus.
Figure 7A:
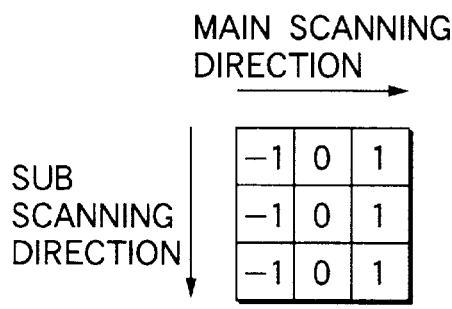
FIGS. 7A to 7D are diagram for representing filter coefficients of filters 71a to 71d in FIG. 6.
Figure 7B:
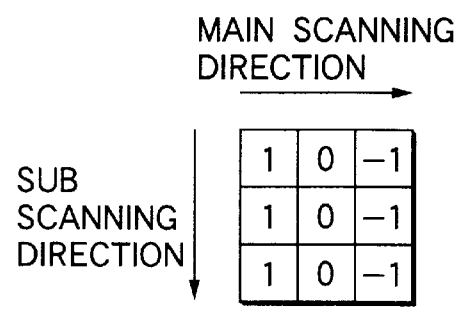
Figure 7C:
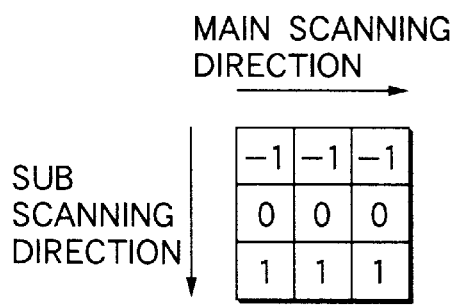
Figure 7D:
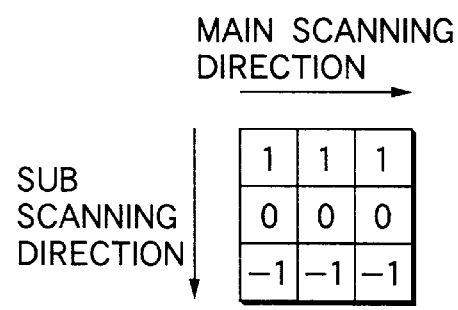

FIG. 6 shows a structural example of the edge detecting unit 15. In this drawing, reference numerals 61a to 61d represent filters having filter coefficients (a) to (d) indicated in FIG. 7. These filters 61a to 61d execute the filtering process operations with respect to the 3×3 block image data ORI4, and then output the filtering results as filtering data FDa to FDd. Reference numeral 62 indicates an edge In FIG. 1, the image data outputted from the buffer 12, the halftone screening unit 13, and the smoothing process unit 14 are synthesized with each other in the selecting unit 16 based upon the object tag ORT1 derived from the buffer 12 and the edge information data ED derived from the edge detecting unit 15 in accordance with an operation table indicated in a table 4. Then, the synthesized image data is outputted from the selecting unit 16 as synthesized image data OUT1. The above-explained selecting process operation by the selecting unit 16 is realized in such a manner that as to each of the pixels, one image data outputted from the buffer 12, the halftone screening unit 13, and the smoothing process unit 14. Furthermore, the conversion process operation is performed so as to print out the pixel indicated by the selected image data under optimum condition, and the producing process operation of the image forming control signals is carried out.

TABLE 4

The operation table of the memory 45.

A Condition 1
B Condition 2
C Selected image
D Image value

TABLE 4

| ORT1 | ED | A 条件1 | B 条件2 | C 選択画像 | D 画素値 | OUTI | OUTW | OUTA |
|---|---|---|---|---|---|---|---|---|
| 00b | 100b<br>101b<br>110b<br>or<br>111b | — | — | ORI1 | 00h~FFh<br>00h~FFh<br>00h~1Fh<br>20h~5Fh<br>60h~9Fh<br>A0h~0Fh<br>E0h~FFh | ORI1<br>ORI1<br>00h<br>FFh | 01b<br>10b<br>00b<br>00b | 11b<br>11b<br>11b<br>00b<br>01b<br>10b<br>11b |
| 01b<br>or<br>10b | 000b | | | | 00h~FFh | ORI1 | 00b | 11b |
| | 100b | ORI1 ≥ TH<br>ORI1 < TH | —<br>SMI > SCI<br>SMI ≤ SCI | SMI<br>SMI<br>ORI1 | —<br>—<br>— | SMI<br>SMI<br>ORI1 | SMW<br>SMW<br>01b | SMA<br>SMA<br>11b |
| | 101b | ORI1 ≥ TH<br>ORI1 < TH | —<br>SMI > SCI<br>SMI ≤ SCI | SMI<br>SMI<br>ORI1 | —<br>—<br>— | SMI<br>SMI<br>ORI1 | SMW<br>SMW<br>10b | SMA<br>SMA<br>11b |
| | 110b<br>or<br>111b | ORI1 ≥ TH<br>ORI1 < TH | —<br>SMI > SCI<br>SMI ≤ SCI | SMI<br>SMI<br>ORI1 | —<br>—<br>00h~1Fh<br>20h~5Fh<br>60h~9Fh<br>A0h~0Fh<br>E0h~FFh | FFh<br>FFh<br>00h<br>FFh | SMW<br>SMW<br>00b<br>00b | SMA<br>SMA<br>11b<br>00b<br>01b<br>10b<br>11b |
| 11b | 000b | — | — | SCI | — | SCI | SCW | SCA |
| | 100b | ORI1 ≥ TH<br>ORI1 < TH | —<br>SMI > SCI<br>SMI ≤ SCI | SMI<br>SMI<br>ORI1 | —<br>—<br>— | SMI<br>SMI<br>ORI1 | SMW<br>SMW<br>01b | SMA<br>SMA<br>11b |
| | 101b | ORI1 ≥ TH<br>ORI1 < TH | —<br>SMI > SCI<br>SMI ≤ SCI | SMI<br>SMI<br>ORI1 | —<br>—<br>— | SMI<br>SMI<br>ORI1 | SMW<br>SMW<br>10b | SMA<br>SMA<br>11b |
| | 110b<br>or<br>111b | ORI1 ≥ TH<br>ORI1 < TH | —<br>SMI > SCI<br>SMI ≤ SCI | SMI<br>SMI<br>ORI1 | —<br>—<br>00h~1Fh<br>20h~5Fh<br>60h~9Fh<br>A0h~0Fh<br>E0h~FFh | FFh<br>FFh<br>00h<br>FFh | SMW<br>SMW<br>00b<br>00b | SMA<br>SMA<br>11b<br>00b<br>01b<br>10b<br>11b |
| | 000b | — | — | ORI1 | — | ORI1 | 00b | 11b |

The above-explained delay adjustment executed in the buffer 12 is carried out in such a manner that the synchronization should be established among the data inputted from the buffer 12, the halftone screening unit 13, the smoothing process unit 14, and the edge detecting unit 15 to the selecting unit 16. Now, a concrete delay amount will be explained.

As previously described, in the smoothing process unit 14, the 5×5 block image data BKD is formed, and then this 5×5 block image data BKD is compared with the pattern (a) to the pattern (x) As a result, while the 5×5 block image data BKD is not formed even when the image data ORI3 is inputted into the smoothing process unit 14 from the buffer 12, the image data SMI is not outputted from the smoothing process unit 14. In other words, while giving an attention to one pixel, a time instant when the image data SMI corresponding to this pixel is outputted from the smoothing process unit 14 is delayed by at least 2 lines and also 2 pixels from another time instant when the image data INI indicative of this pixel is inputted into the buffer 12.

Also, in the edge detecting unit 15, while paying an attention to one pixel in order to process the 3×3 block image data formed in the buffer 12, a time instant when the edge information data ED corresponding to this pixel is outputted from the edge detecting unit 15 is delayed by at least 1 line and also 1 pixel from another time instant when the image data INI indicative of this pixel is inputted into the buffer 12. It should be noted that since the image data need not be handled in unit of the block in the halftone screening unit 13, there is no delay in the data processing operation.

As a consequence, in the buffer 12, the above-explained synchronization can be established as follows. That is, while setting as a reference such a time instant when both the image data INI and the object tag INT with respect to the pixel of interest are inputted into the buffer 12, a time instant when both the image data and the object tag as to this pixel of interest are supplied from the buffer 12 to the halftone screening unit 13 and the selecting unit 16 is delayed by the 2 lines and 2 pixels, and furthermore another time instant when the 3×3 block image data ORI4 where this pixel of interest is defined as a center pixel is supplied from the buffer 12 to the edge detecting unit 15 is delayed by the 1 line and 1 pixel.

It should also be noted that both the image data ORI3 and the object tag ORT3 inputted into the smoothing process unit 14 may be obtained by directly outputting both the image data INI and the object tag INT, which are inputted into the buffer 12, from this buffer 12 without any delay. Also, no specific consideration is made as to delays caused by factors other than the dimension of the blocks handled in the respective units while the above-explained delay process operation is carried out. More specifically, no care is taken to the processing delays and the transfer delays caused when the data is processed by way of the hardware. However, these delays may be basically compensated by a similar processing operation. That is, the above-explained synchronization can be established as follows. While setting as a reference such a time instant when the image data INI and the object tag INT are inputted into the buffer 12, the output timing from the buffer 12 is delayed in connection with the process path having the largest delay amount, so that the synchronization can be established.

Next, a description will be made of a printing operation by the electrophotographic printing system with respect to the image forming control process operation when an image is printed out, and this image is indicated by data outputted from this image processing apparatus. While there are various image forming control methods in the electrophotographic printing system, a pulse width modulation method and a power amplitude modulation method will now be explained. The pulse width modulation method (will be referred to as "PWM" hereinafter) and the power amplitude modulation method (will be referred to as "PAW" hereinafter) are especially known as the image forming control method capable of printing out characters/line drawings in a smooth manner.

In accordance with the PWM method, an input digital data having a multiple value is once D/A-converted into a voltage variable signal (will be referred to as a "conversion signal" hereinafter). A voltage level of this conversion signal is compared with a voltage level of a reference wave having the same time period as the input time period of the input data. When the conversion signal is higher than reference wave, a light emitting element is turned ON, whereas when the conversion signal is lower, the light emitting element is turned OFF. According to this PWM method, while the digital data having the multiple value which should be D/A-converted is used as the image data OUTI outputted from this apparatus, the reference wave to be compared is selected in response to the image forming control signal OUTW derived from this apparatus. As a result, both the dimension of the pixel along the main scanning direction and the forming position of this pixel can be controlled.

Figure 8:
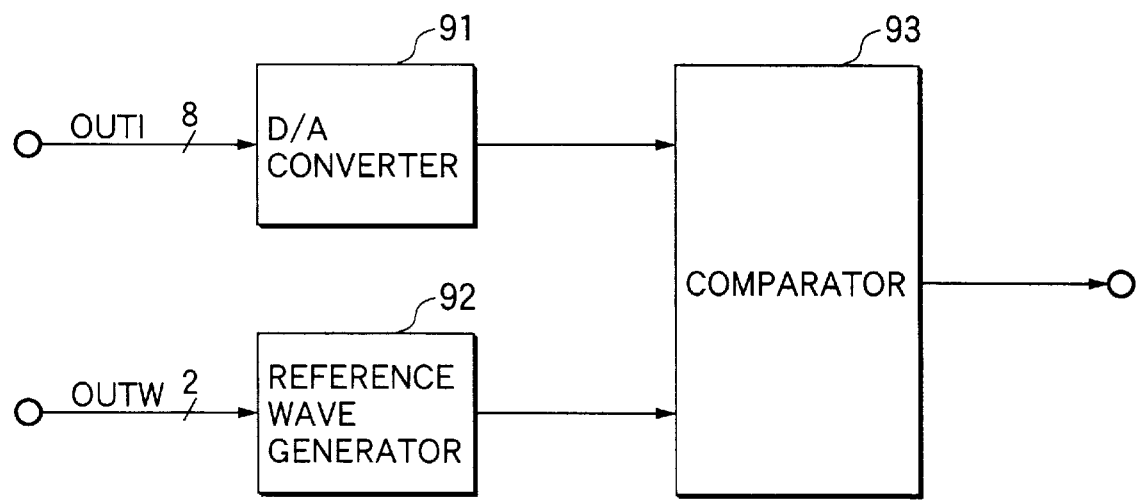
FIG. 8 is a diagram for indicating a structural example for executing a pulse width modulation with employment of an output signal of the image processing apparatus.

FIG. 8 is a block diagram for showing a circuit arrangement capable of realizing the PWM method. In this drawing, reference numeral 91 shows a D/A converter for inputting the image data OUTI and for outputting the conversion signal, and reference numeral 92 indicates a reference wave generator for generating the reference wave. In response to the image forming control signal OUTW, this reference wave generator 91 generates the reference wave. Reference numeral 93 represents a comparator. The comparator 93 compares the voltage level of the conversion signal outputted from the D/A converter 91 with the voltage level of the reference wave outputted from the reference wave generator 92 to output a binary comparison result.

Figure 9:
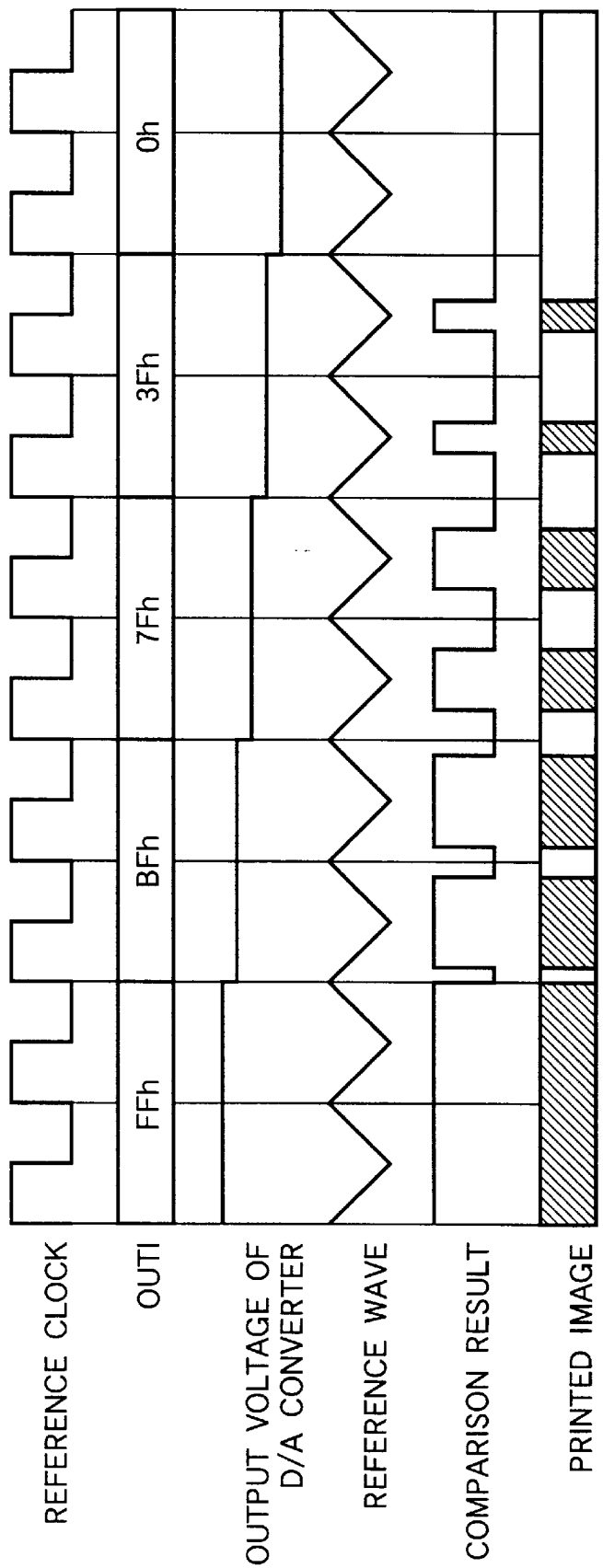
FIG. 9 is an explanatory diagram for explaining one example of the pulse width modulation by the structural example shown in FIG. 8.
Figure 10:
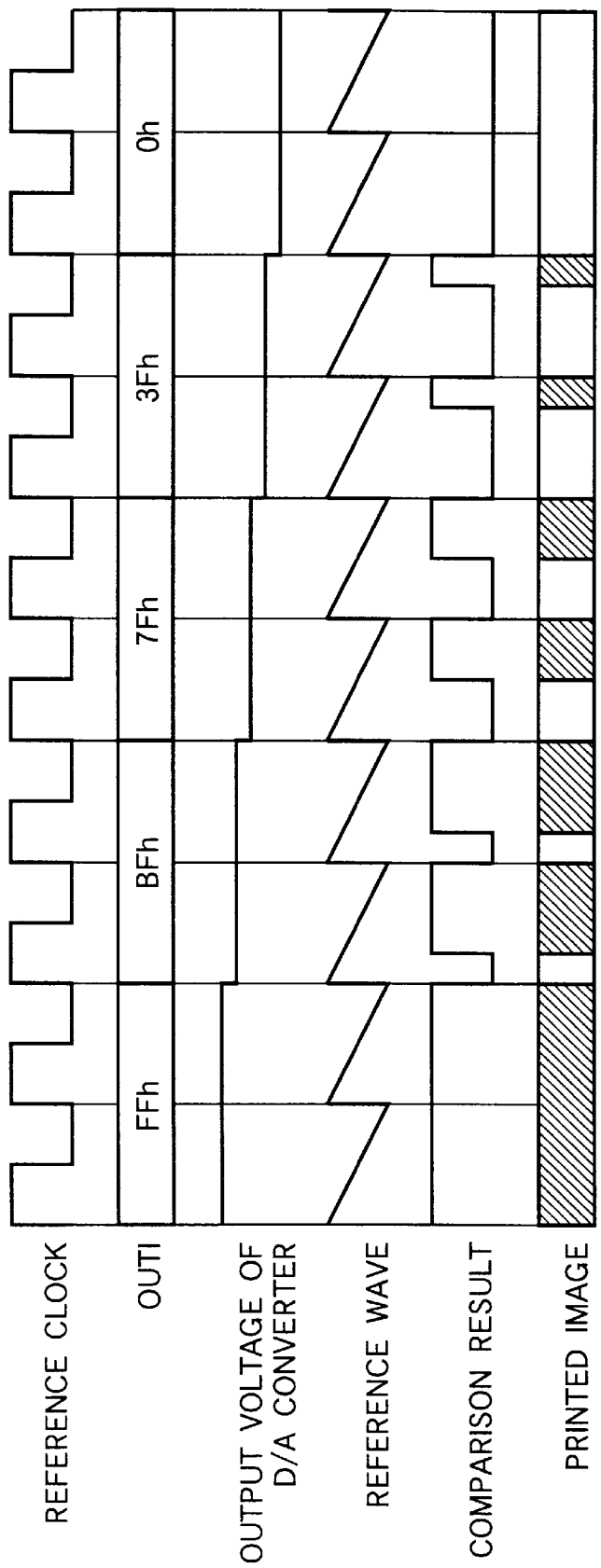
FIG. 10 is an explanatory diagram for explaining another example of the pulse width modulation by the structural example shown in FIG. 8.
Figure 11:
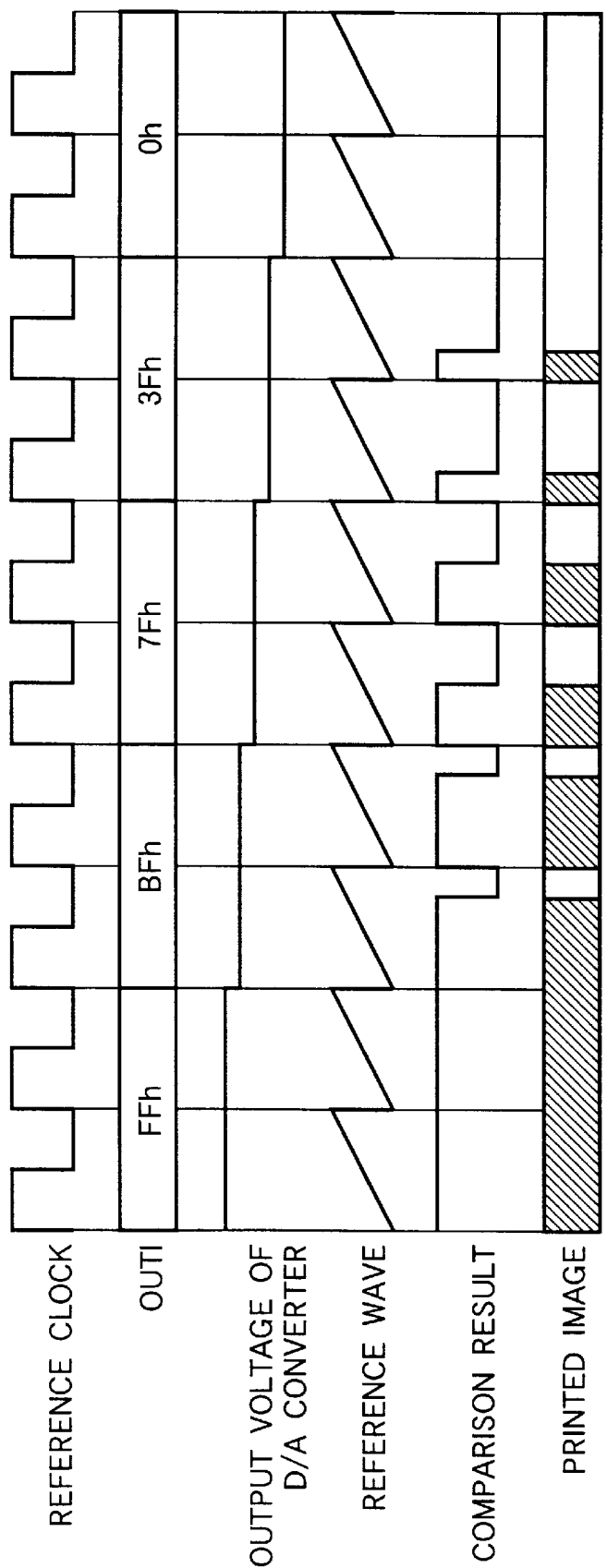
FIG. 11 is an explanatory diagram for explaining another example of the pulse width modulation by the structural example shown in FIG. 8.

FIG. 9 to FIG. 11 represent conditions of image forming control operations in the case that reference waves different from each other are employed. The horizontal direction corresponds to the main scanning direction in the drawings. In the respective drawings, an output voltage value of the D/A converter 91 is gradually lowered in response to an input pixel value (value of image data OUTI). A width of a block pixel in a printed image along the main scanning direction (will be referred to as a "horizontal printed width" hereinafter) is narrowed in proportional to this output voltage value. In other words, the respective drawings represent such an example that the printed image gradually becomes thin along the main scanning direction.

Also, these drawings show influences caused by the shape of each reference wave, which are given to the positions of the block pixels. For example, in the example of FIG. 9, the horizontal printed width is equal to the width of the pixel from the center position thereof, and the position of the block pixel is equal to the center position. In contrast, in the example of FIG. 10, the left end of this drawing corresponds to a starting point of the horizontal printed width, whereas in the example of FIG. 11, the right end of this drawing corresponds to a starting point of the horizontal printed width. The position of the black pixel is located at the left end in FIG. 10, and the position of the black pixel is located at the right end in FIG. 11. It should be understood in this embodiment that when the value of the image forming control signal OUTW is equal to "00h", the reference wave shown in FIG. 9 is selected; when the value of the image forming control signal OUTW is equal to "01b", the reference wave shown in FIG. 10 is selected; and when the value of the image forming control signal OUTW is equal to "10b", the reference wave shown in FIG. 11 is selected.

Figure 12:
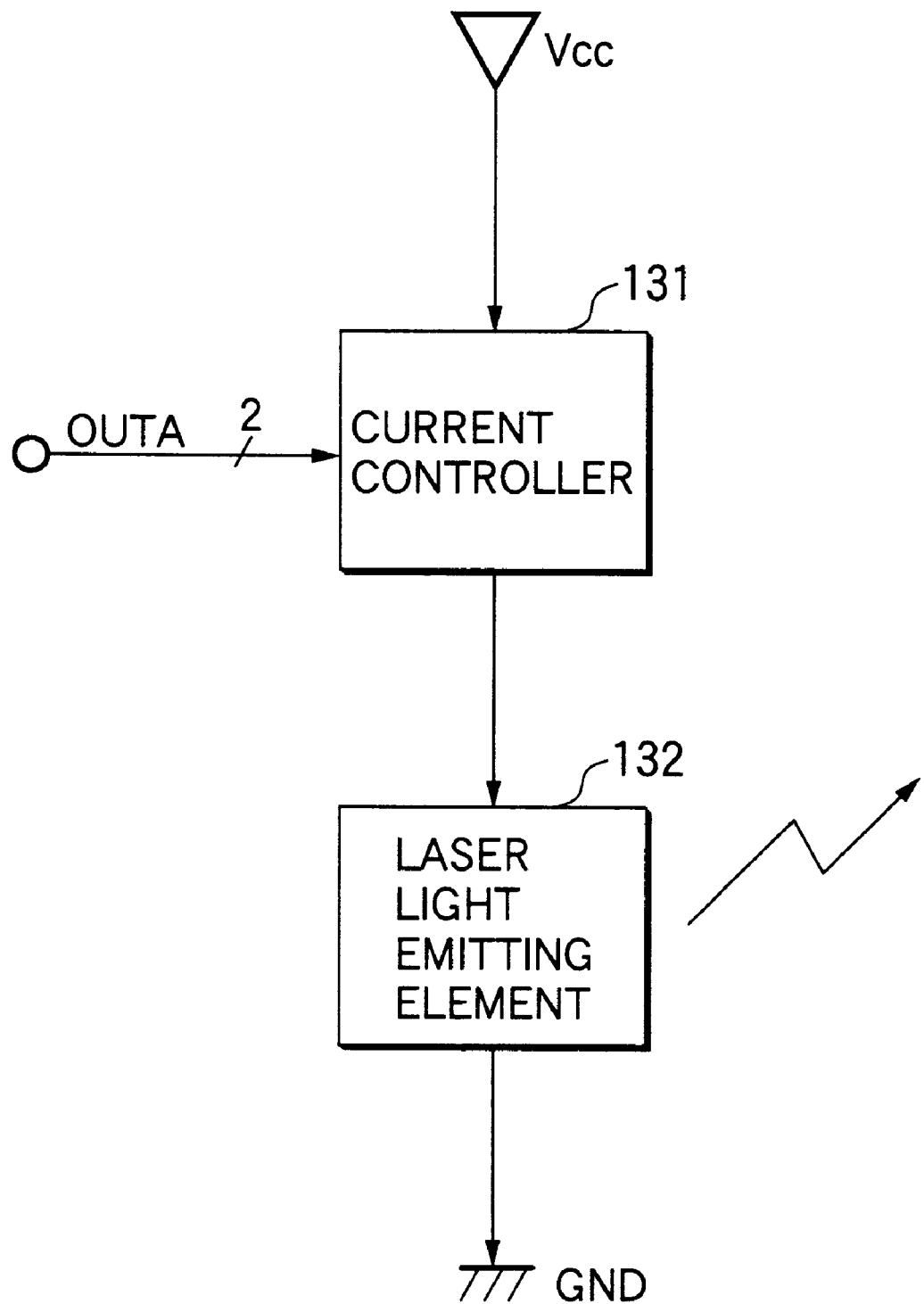
FIG. 12 is a diagram for showing a structural example for executing a power amplitude modulation by using an output signal from the image processing apparatus.

On the other hand, the PAM method is such a method that in response to an input digital data having a multiple value, a current supplied to a light emitting element is controlled so as to control a light emitting amount of the light emitting element. The PWM method corresponds to the method for controlling the printed width along the main scanning direction, whereas the PAW method corresponds to the method for controlling the printed width along the sub-scanning direction (will be referred to as a "vertical printed width" hereinafter). FIG. 12 shows an arrangement for realizing the PAW method. In FIG. 12, reference numeral 131 indicates a current controller for outputting a signal of a current value in response to an image forming control signal OUTA, and reference numeral 132 shows a laser light emitting element for inputting thereinto the output signal of the current controller 131. That is, this element is a laser light emitting element for emitting light having power amplitude in response to a current value of an input signal.

Figure 13:
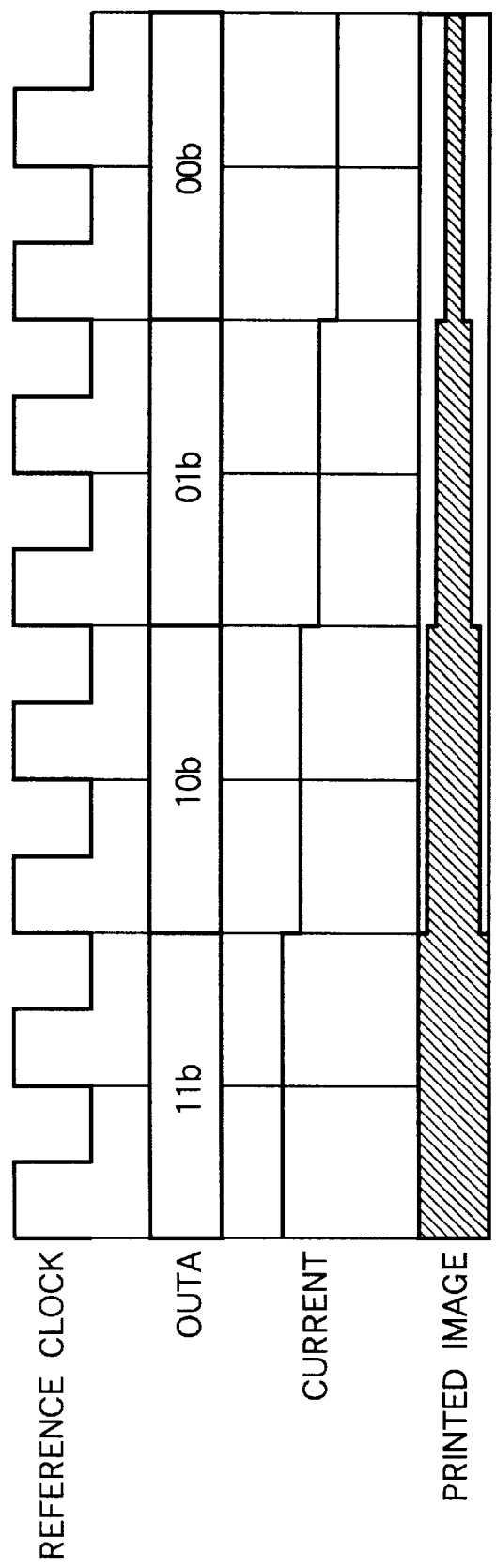
FIG. 13 is an explanatory diagram for explaining an example of the power amplitude modulation by the structural example shown in FIG. 12.

FIG. 13 represents conditions of an image forming control. As apparent from this drawing, the vertical printed width is varied in response to the value of the image forming control signal OUTA. It should be understood in this embodiment that when the value of the image forming control signal OUTA becomes "11b", the printed width is set to the normal vertical printed width; when the value of the image forming control signal OUTA becomes "10b", the printed width is set to ¾ of the normal vertical printed width; when the value of the image forming control signal OUTA becomes "01b", the printed width is set to ½ of the normal vertical printed width; and when the value of the image forming control signal OUTA becomes "00b", the printed width is set to ¼ of the normal vertical printed width.

As apparent from the forgoing description, when the black pixel on the printed image is positionally shifted along the main scanning direction, the PWM method is suitable whereas when the black pixel on this printed image is positionally shifted along the sub-scanning direction, the PAW method is suitable. In accordance with this embodiment, the PWM method and the PAW method are exclusively employed. Although both the PWM method and the PAM method may be simultaneously applied to a single pixel, a very complex control is required. Therefore, in this embodiment, any one of the PWM method and the PAW method is exclusively applied to such a single pixel.

B: OPERATION

Next, operations of this image processing apparatus will now be explained.

Figure 2:
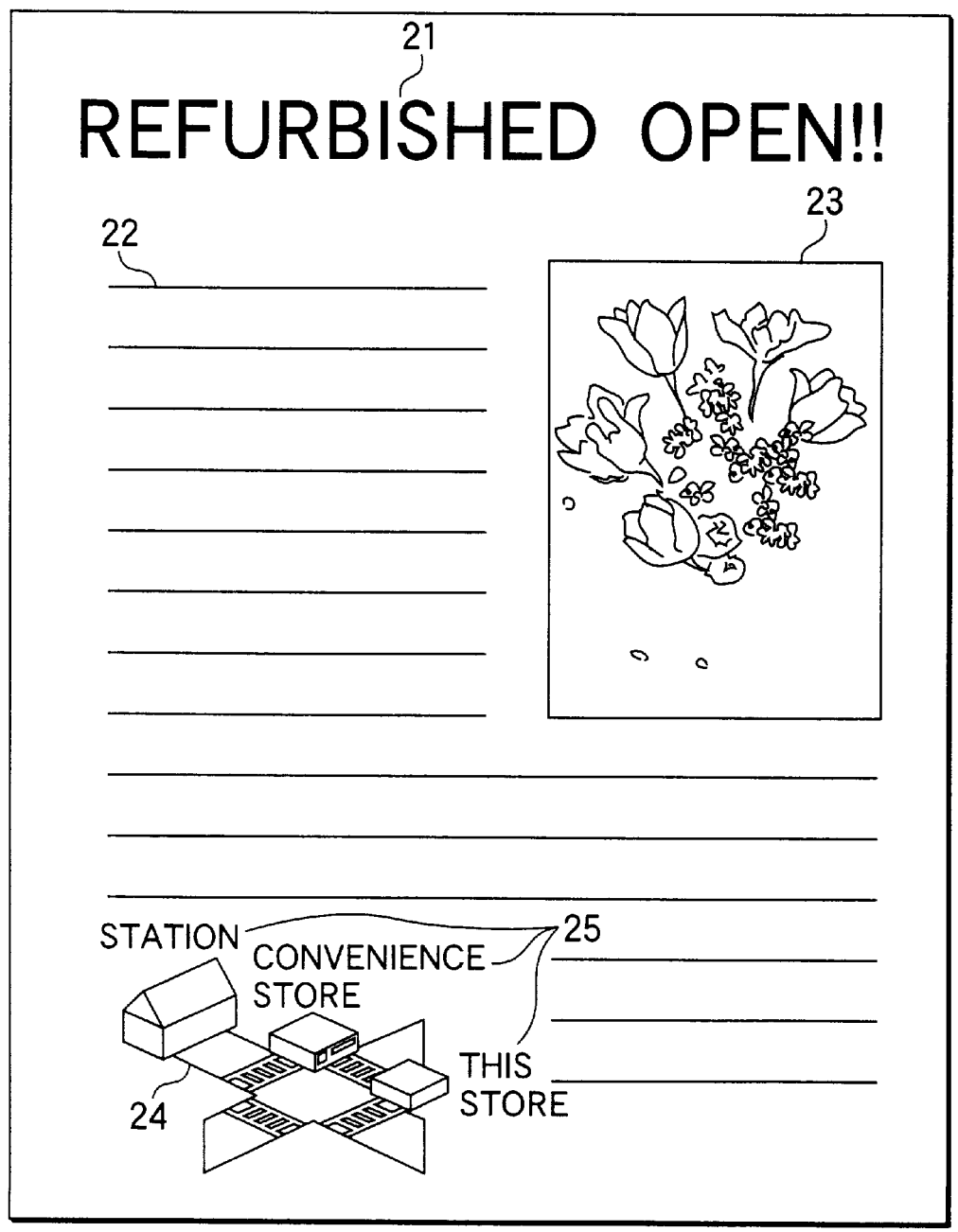
FIG. 2 is a diagram for showing one example of an image (input image) inputted into the image processing apparatus.
Figure 3:
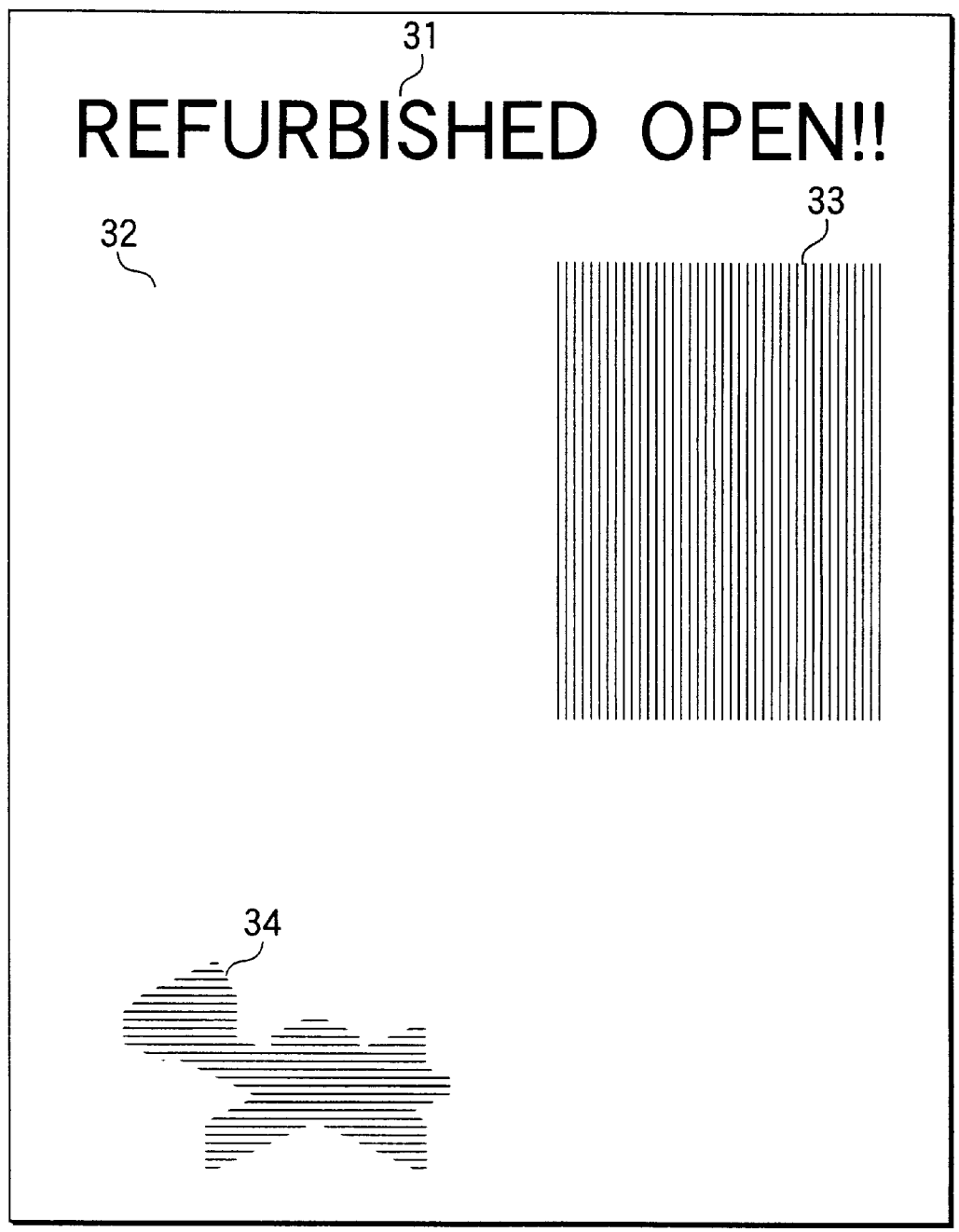
FIG. 3 is a diagram for showing a classification result obtained from the object tag adding unit 11 for the input image shown in FIG. 2.

When image data indicative of an image shown in FIG. 2 is imputed into the present apparatus, an object tag is added to this image data by the object tag adding unit 11. In FIG. 2, reference numeral 21 indicates a binary-rasterized character having a relatively large size on the order of 24 points, reference numerals 22 and 25 show multi-valued-rasterized characters having relatively small sizes of 10 points, reference numeral 23 represents a photograph inputted by an image input apparatus such as an image scanner or a digital camera, and reference numeral 24 denotes a figure formed by combining a line and a polygon. It should be understood that different object tags are added to these objects. FIG. 3 represents images made by visualizing the object tags applied to the respective pixels contained in the image shown in FIG. 3. In FIG. 3, reference numeral 31 indicates a binary-rasterized character, reference numeral 32 shows a multi-valued-rasterized character, reference numeral 33 indicates a photograph, and reference numeral 34 is a region constituted by pixels to which object tags indicative of graphics are added. As indicated in FIG. 3, in this case, an object tag of a multi-valued rasterized character is added to a pixel of a background region.

Both the image data (see FIG. 2) and the object tag (see FIG. 3) outputted from the object tag adding unit 11 are delay-adjusted in the buffer 12. Thereafter, the delay-adjusted image data and object tag are inputted into the halftone screening unit 13, the smoothing process unit 14, and the selecting unit 16. Also, in the buffer 12, the 3×3 block image data are sequentially formed from the image data outputted from the object tag adding unit 11. After this 3×3 block image data is delay-adjusted, the delay-adjusted 3×3 block image data is inputted into the edge detecting unit 15.

Figure 14A:
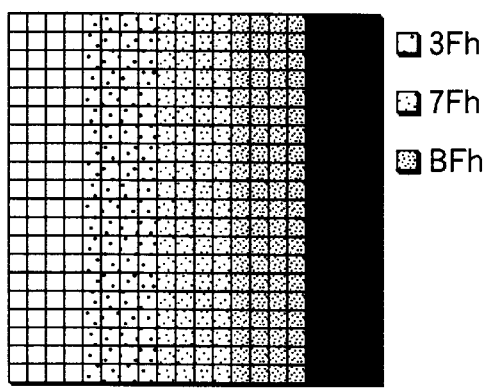
FIGS. 14A to 14D are explanatory diagram for explaining a halftone screening operation by the image processing apparatus.
Figure 14B:
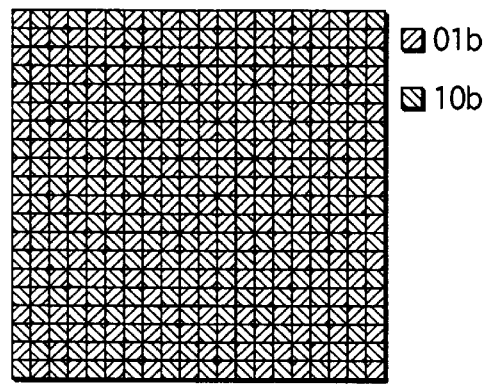
Figure 14C:
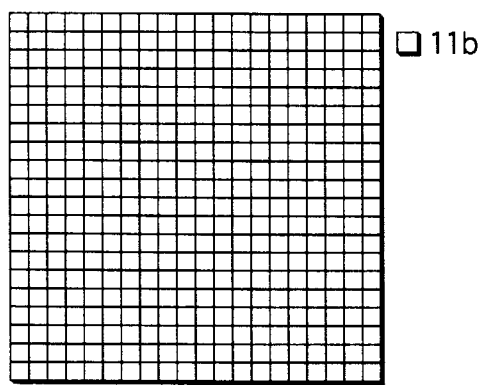
Figure 14D:
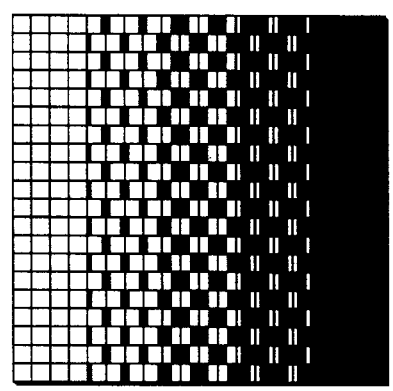

Among the image data inputted into the halftone screening unity 13, the halftone screening operation is carried out only for the pixels, the added object tags of which are equal to "10b" and "11b", namely only for the region 23 classified as "photograph" and the region 24 classified as "graphics". Thereafter, the area-gradation-processed pixels are outputted to the selecting unit 16. For instance, when the area gradation process operation by the halftone screening unit 13 is carried out for partial image data exemplified in FIG. 14A, this partial image data is outputted as the image data SCI, an image forming control signal shown in FIG. 14B is outputted as the image forming control signal SCW, and another image forming control signal shown in FIG. 14C is outputted as the image forming control signal SCA from the halftone screening unit 13.

Figure 15A:
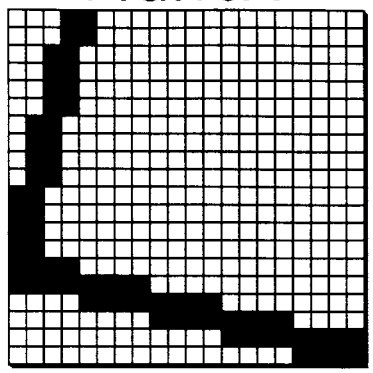
FIGS. 15A to 15H are diagram for representing an example of a smoothing process operation by the image processing apparatus.
Figure 15B:
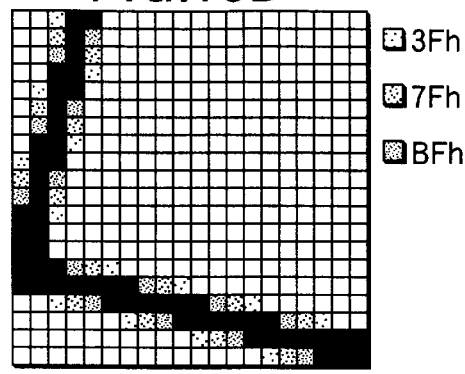
Figure 15C:
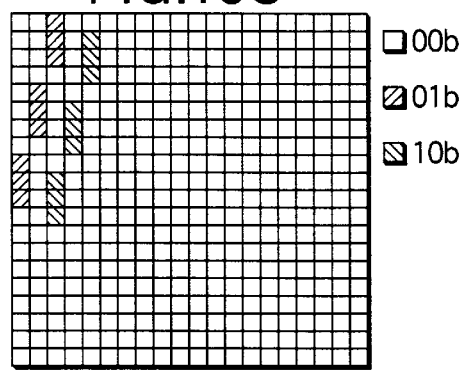
Figure 15D:
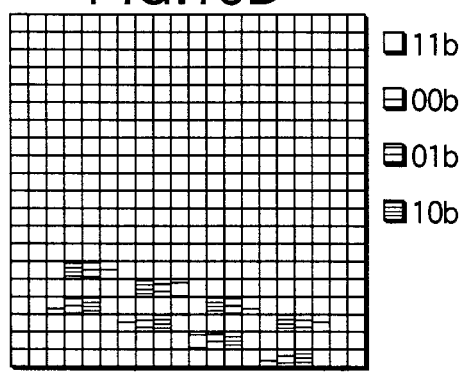
Figure 15E:
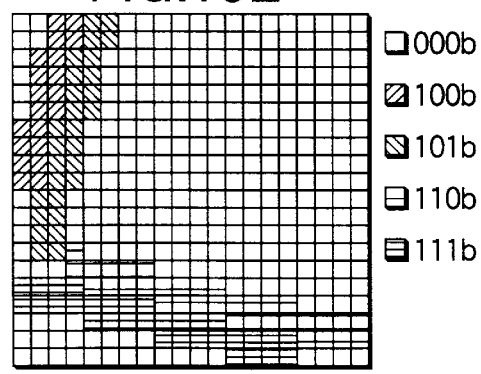

On the other hand, among the image data indicative of the image of FIG. 2 and inputted into the smoothing process unit 14, the smoothing process operation is carried out only for such a pixel, the added object tag of which is equal to "00b", namely, only for the pixel of the region 21 classified into the binary-rasterized character. Thereafter, the smoothing-processed pixel is outputted to the selecting unit 16. For example, when the smoothing process operation by the smoothing processing unit 14 is carried out for partial image data exemplified in FIG. 15A, another partial image data shown in FIG. 15B is outputted as the image data SMI, an image forming control signal shown in FIG. 15C is outputted as the image forming control signal SMW and another image forming control signal shown in FIG. 15D is outputted as the image forming control signal SMA from the smoothing process unit 14.

Also, the edge detecting unit 15 judges as to whether or not all of the pixels of the image shown in FIG. 2 are edges. When all of these pixels are edges, directions of these edges are checked. The edge detecting result made based on the judgment result (and check result) is outputted to the selecting unit 16. For example, the edge detecting result ED with respect to the partial image data shown in FIG. 14A becomes "000b" as to all of the pixels indicated by this partial image data. The edge detecting results ED with respect to the partial images indicated in FIG. 15A and FIG. 16E are those indicated in FIG. 15E and FIG. 16F, respectively.

Figure 15F:
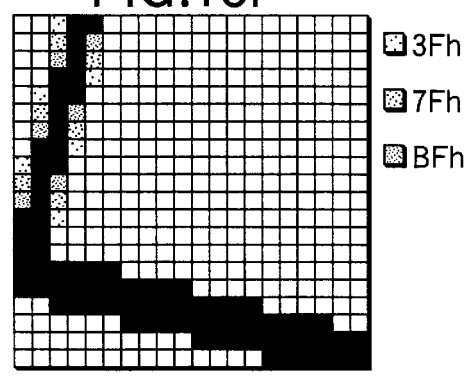
Figure 15G:
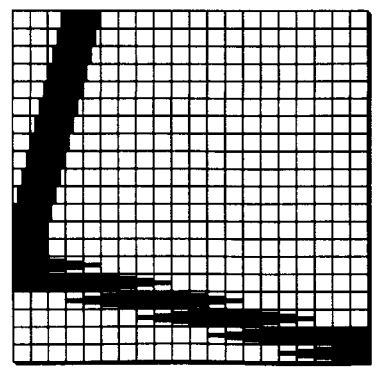
Figure 15H:
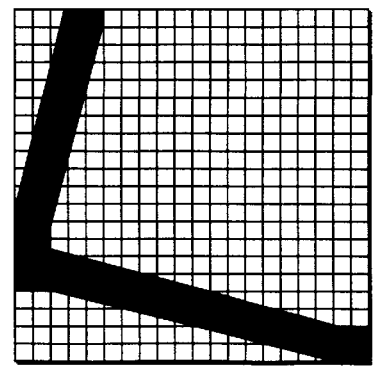

In the selecting unit 16, a plurality of image data inputted from the respective circuit units are synthesized with each other in accordance with the operation table of the table 3, and furthermore, the image forming control signals inputted from the respective circuit units are selected and produced in accordance with the operation table of the table 3. In such a case that the image data inputted into the object tag adding unit 11 corresponds to the image data indicative of the image of FIG. 2, as to the pixel of the region 21, the selecting unit 16 executes the converting process operation based upon the image and image forming control signal outputted from the smoothing process unit 14, and further the edge detecting result outputted from the edge detecting unit 15. Both the image data and the image forming control signal, which correspond to this converting process result, are outputted from the selecting unit 16 to the external appliance of this image processing apparatus. For instance, when the partial image data shown in FIG. 15B to FIG. 15D and the image forming control signal are inputted into the selecting unit 16, partial image data shown in FIG. 15F is outputted as the image data OUTI; an image forming control signal indicated in FIG. 15C is outputted as an image forming control signal OUTW; and another image forming control signal indicated in FIG. 15D is outputted as the image forming control signal OUTA from the selecting unit 16.

Figure 17A:
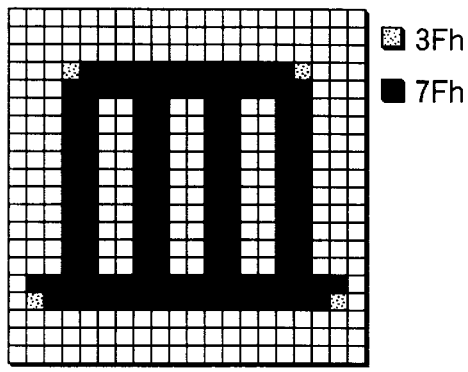
FIGS. 17A to 17D are diagram for showing a processing example of a multi-valued-rasterized character.
Figure 17B:
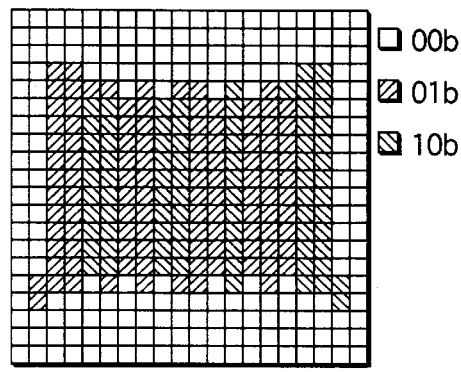
Figure 17C:
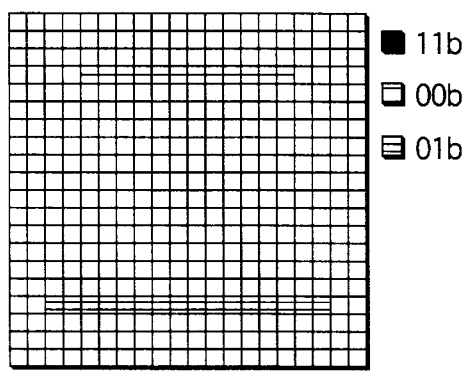

Also, the converting process operation is carried out for the pixels of the region 22 and of the region 25 based upon the pixel value and the edge detecting result made by the edge detecting unit 15. Both the image data and the image forming control signal, which correspond to this converting process result, are outputted from the selecting unit 16 to the external appliance of this image processing apparatus. For example, when an edge detecting result shown in FIG. 16E is inputted from the edge detecting unit 15 to the selecting unit 16, partial image data shown in FIG. 17A is outputted as the image data OUTI; an image forming control signal indicated in FIG. 17B is outputted as the image forming control signal OUTW; and another image forming control signal indicated in FIG. 17C is outputted as the image forming control signal OUTA from the selecting unit 16.

Also, the converting process operation is carried out for the pixels of the region 23 and of the region 24 based upon the image data and the image forming control signal outputted from the halftone screening unit 13, and further the edge detecting result outputted from the edge detecting unit 15. Both the image data and the image forming control signal, which correspond to this converting process result, are outputted from the selecting unit 16 to the external appliance of this image processing apparatus. For instance, when the partial image data shown in FIG. 14A to FIG. 14C and the image forming control signal are inputted into the selecting unit 16, partial image data shown in FIG. 14A is outputted as the image data OUTI; an image forming control signal indicated in FIG. 14B is outputted as the image forming control signal OUTW; and another image forming control signal indicated in FIG. 14C is outputted as the image forming control signal OUTA from the selecting unit 16.

Figure 17D:
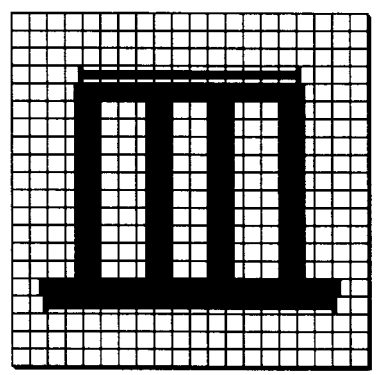
Figure 17E:
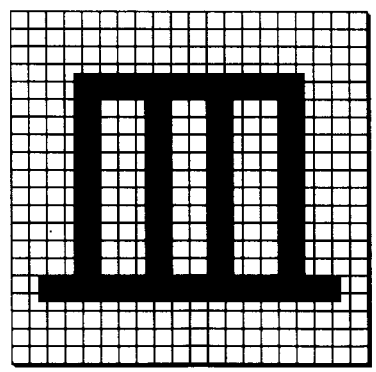

When the printing operation is carried out by using the electrophotographic printing system having both the PWM function and the PAW function in response to the image data and the image forming control signals, which are outputted from the selecting unit 16 to the external appliance of this image processing apparatus, light emitting patterns of the light emitting elements are produced as follows. For example, as to the region shown in FIG. 15A, this light emitting pattern is given in FIG. 15G; as to the region shown in FIG. 14A, this light emitting pattern is given in FIG. 14D; and also as to the region shown in FIG. 16E, this light emitting pattern is given in FIG. 17D. Printed results made on a printing medium such as paper are given in FIG. 15H, FIG. 14D, and FIG. 17E, respectively. In other words, the image of the binary-rasterized character region as in the region 21 is smoothing-processed to form the printed image thereof. The image of the photographic region such as the region 23 and the image of the graphics region such as the region 24 are area-gradation-processed to form the printed images thereof. Also, the images of the multi-valued-rasterized character regions such a s the region 22 and the region 25 are processed in such a manner that the resolution is rasterized with employment of the half tone portion. Then, the printed images thereof are formed.

C. SUPPLEMENTARY ITEM

While the image processing apparatus according to an embodiment of the present invention has been described, the present intention is not limited to this image processing apparatus, but may be modified without departing from the technical scope and spirit of the present invention.

For instance, in the above-explained embodiment, the PWM method is used as the image forming control method along the main scanning direction. Alternatively, another image forming control method may be employed. That is, a pixel is subdivided into a plurality of small pixels along the main scanning direction. Then, the formation/non-formation of the respective small pixels may be determined based upon the values of the original pixels. To employ this alternative method, the circuit arrangement capable of realizing the PWM method shown in FIG. 8 may be simply replaced by a circuit arrangement shown in FIG. 18.

Figure 18:
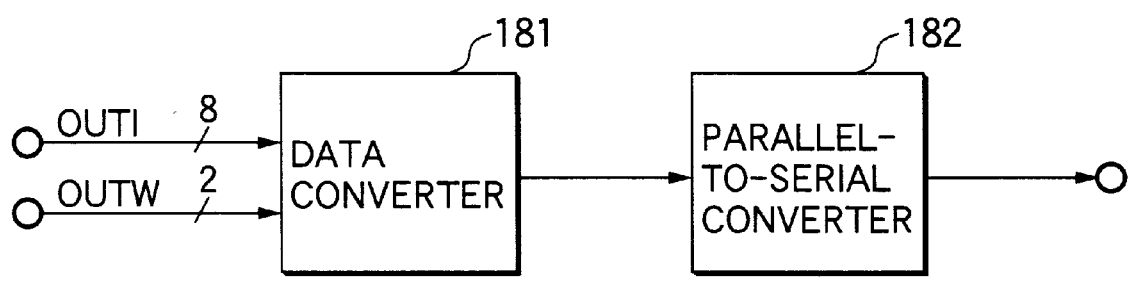
FIG. 18 is a diagram for indicating a structural example for realizing a printing method for subdividing a pixel into a plurality of small pixels along a main scanning direction.

In FIG. 18, reference numeral 181 indicates a data converter, and reference numeral 182 represents a parallel-to-serial converter. The data converter 181 converts the image data OUTI outputted from the selecting unit 16 in the above-explained embodiment into another image data in response to the image forming control signal OUTW. This converted image data is inputted into the parallel/serial converter 182 so as to be converted into serial image data. This parallel/serial converter 182 outputs the serial image data as a light emitting timing signal to the light emitting element. It should be noted that the values of the data outputted form the data converter 181 are given as "7h" and "6h", namely, all bits of these values continuously appear as "1" expressed in the binary notation.

Figure 19:
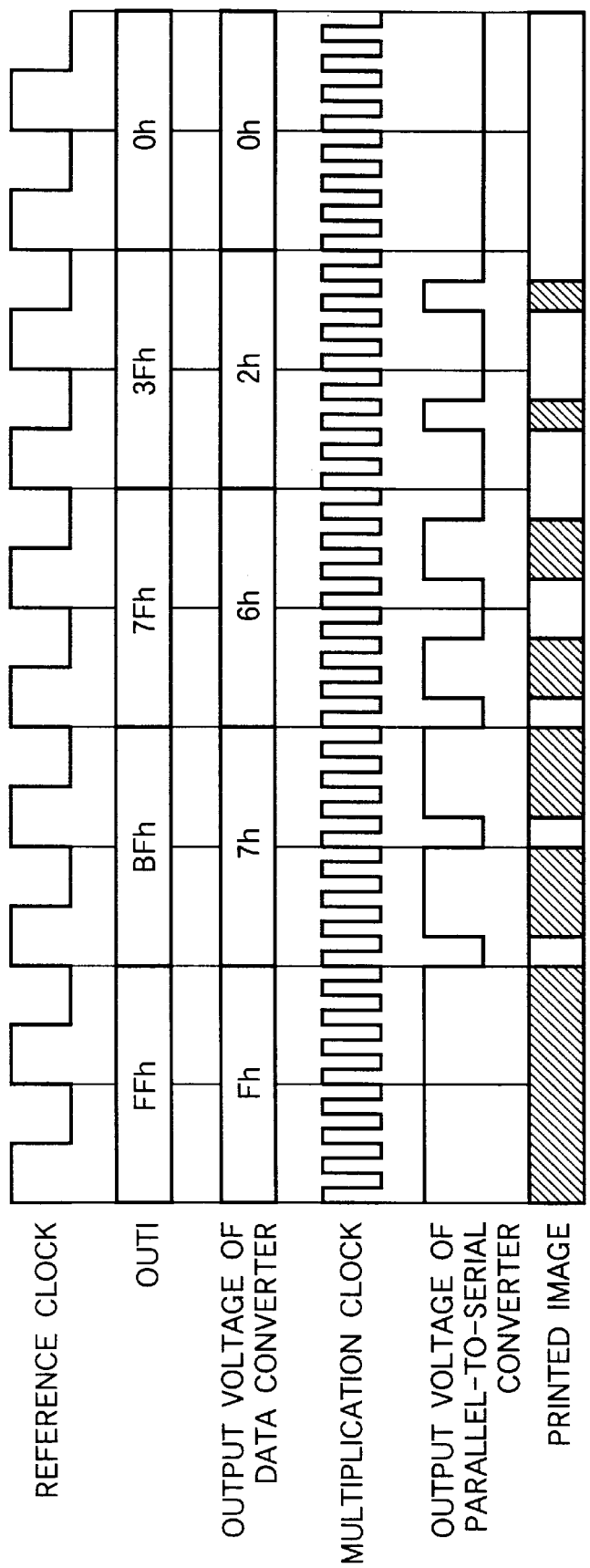
FIG. 19 is an explanatory diagram for explaining one example of the pulse width modulation by the structural example shown in FIG. 17.
Figure 20:
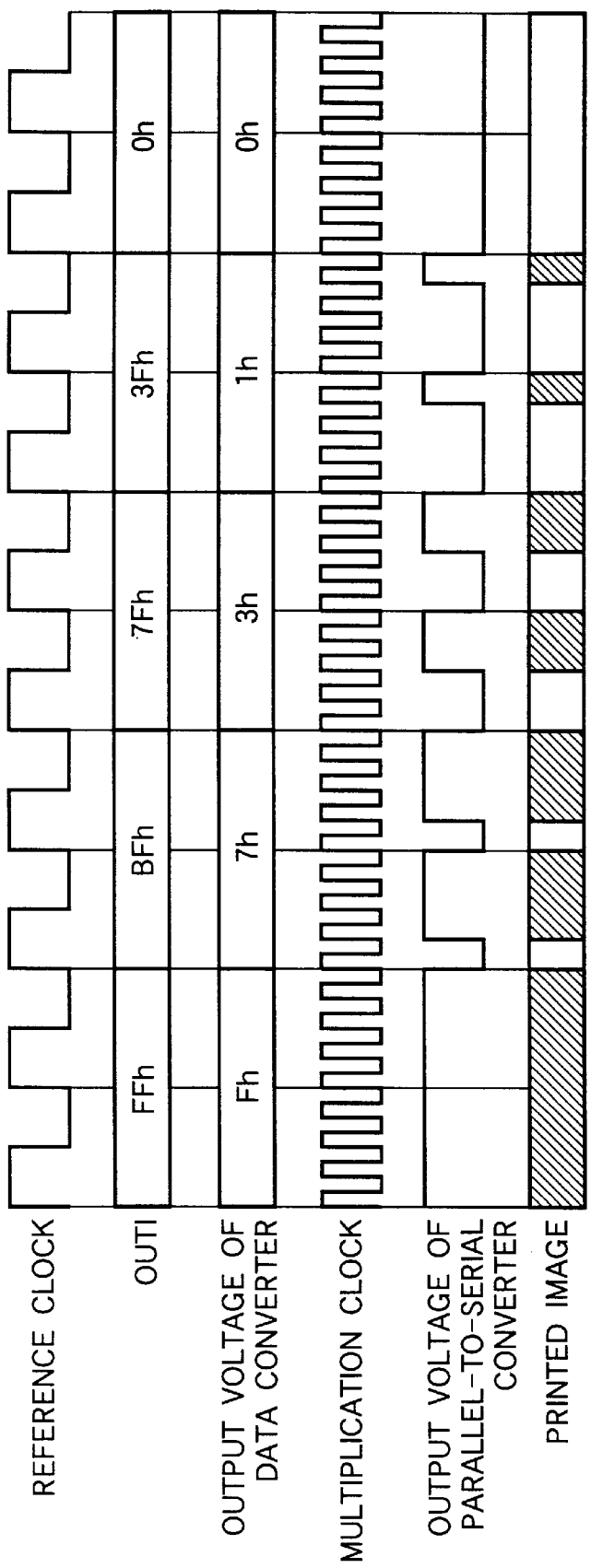
FIG. 20 is an explanatory diagram for explaining another example of the pulse width modulation by the structural example shown in FIG. 17.
Figure 21:
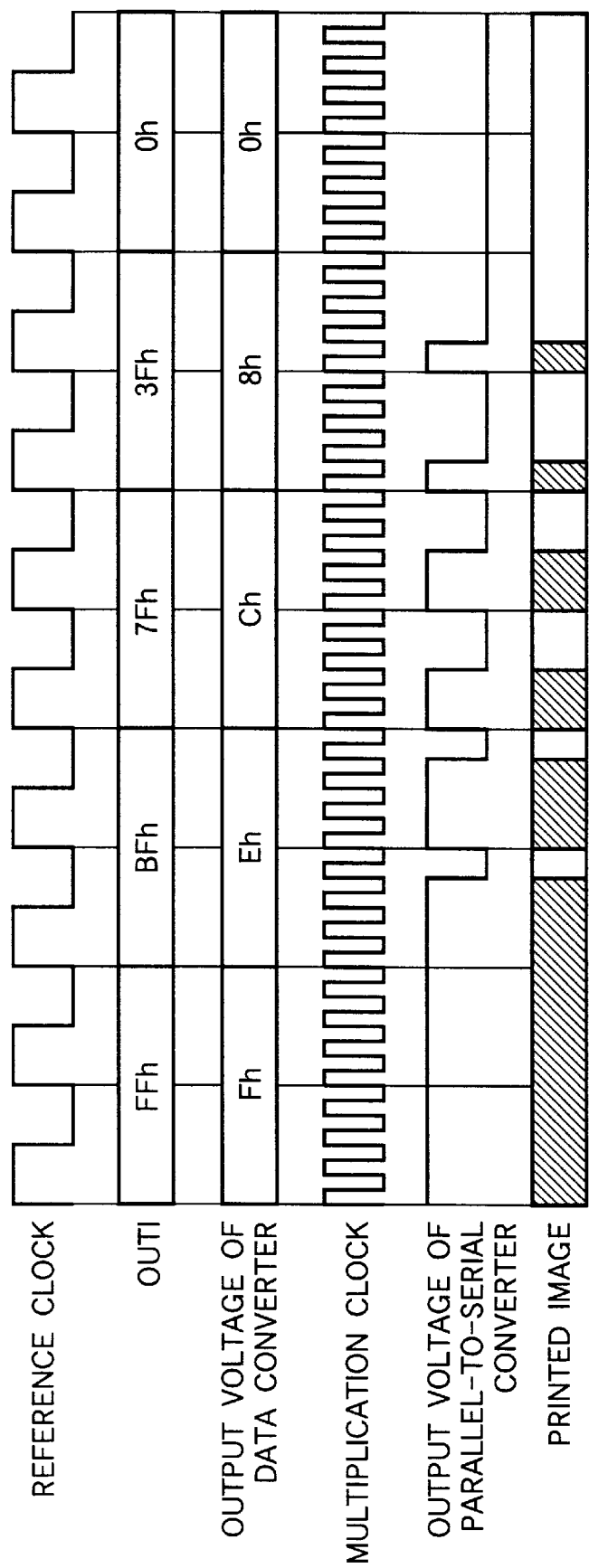
FIG. 21 is an explanatory diagram for explaining another example of the pulse width modulation by the structural example shown in FIG. 17.

Now, one example will be explained. That is, a process operation is carried out in such a case that a single pixel is subdivided into 4 small pixels along the main scanning direction. When the value of the image forming control signal OUTW is equal to "00b", the image data OUTI outputted from the selecting unit 16 is converted in response to the image forming control signal OUTW, and then the converted image data is parallel/serial-converted to produce a light emitting timing signal, as shown in FIG. 19. Finally, a printed image shown in the lowermost stage of this drawing is obtained. When the value of the image forming control signal OUTW is equal to "01bT", the image data OUTI outputted from the selecting unit 16 is converted in response to the image forming control signal OUTW, and then the converted image data is parallel/serial-converted to produce a light emitting timing signal, as shown in FIG. 20. Finally, a printed image shown in the lowermost stage of this drawing is obtained. Also, when the value of the image forming control signal OUTW is equal to "10b", the image data OUTI outputted from the selecting unit 16 is converted in response to the image forming control signal OUTW, and then the converted image data is parallel/serial-converted to produce a light emitting timing signal, as shown in FIG. 21. Finally, a printed image shown in the lowermost stage of this drawing is obtained. It should also be noted that the parallel/serial converter 182 uses such a clock in the converting process operation. This clock is produced by doubling a reference clock in accordance with the total dividing number (for example, 4) of the pixel along the main scanning direction.

Also, the above-described embodiment has described the printing operation by employing the electrophotographic printing system. Alternatively, the present invention may be applied to other printing operations by employing the ink jet printing system and the thermal transfer printing system. For example, assuming now that a printing operation is carried out by employing an ink jet printer having light-colored ink in addition to the normal YMCK color ink, such a mechanism may be simply interposed between the selecting unit 16 and a printer head control unit . This mechanism may determine the ink used to form the respective pixels in response to the image data OUTI, and the image forming control signals OUTW and OUTA derived from the selecting unit 16. It should be understood that in this ink determining mechanism, the format of the image data is merely changed, but this image data itself is not further processed. As a consequence, the above-described ink determining mechanism may be similarly applied to another case that such an ink jet printer capable of controlling a dimension of an ink droplet is used to print out an image.

Also, assuming now that the printing operation is carried out by employing the thermal transfer printing system, the following mechanism may be interposed between the selecting unit 16 and the printer head control unit. This mechanism may determine a heat generation amount of the printer head required to form the respective pixels in response to the image data OUTI, and the image forming control signals OUTW and OUTA derived from the selecting unit 16. Also, in this case, the format of the data is merely changed, and no process operation is carried out for the image itself. In other words, since any of the above-described modification may output the same pixel in a similar manner irrespective of the different printing systems, the data formats are merely converted based upon the features of the image forming systems of the printers. Therefore, these modifications are involved in the technical scope and spirit of the present invention.

The overall arrangement of the image processing apparatus according to the embodiment is represented in FIG. 1. Apparently, the present invention is not limited to this arrangement, but may be substituted by other arrangements without departing from the technical scope and spirit of the present invention. Also, the halftone screening unit 13 may arbitrarily employ other processing operations, for example, the dither processing operation with employment of the dither matrix, and the error diffusion process operation. Furthermore, although the halftone screening unit 13 executes the same halftone screening operation with respect to both the photographic region and the graphics region, this halftone screening unit 13 may perform the different halftone screening operations. The arrangement of the smoothing process unit 14 is realized by that of FIG. 4, and the arrangement of the edge detecting unit 15 is realized by that of FIG. 6. Alternatively, other arrangements capable of realizing the smoothing process operation and the edge detecting process operation may be employed. Apparently, the dimension of the block formed in the buffer 43 in the smoothing process operation 14 is not limited to 5 pixels×5 pixels, but may be realized by other pixels. Also, the patterns detected by the pattern detectors 44a to 44x are not limited to the patterns shown in FIG. 5A to FIG. 5X, but may be realized by other patterns. Furthermore, the input/output correspondence relationship of the memory 45 is not limited to that shown in the table 2, but may be realized by other relationships. In addition, the dimension of the block inputted from the buffer 12 into the edge detecting unit 15 is not limited to 3 pixels×3 pixels, but may be realized by other dimensions. Also, the filter coefficients of the filters 61a to 61d are not limited to the filter coefficients indicated in FIG. 7A to FIG. 7D, but may be realized by other filter coefficients. The correspondence relationship between the filter output and the edge information is not limited to that defined in the table 3, but may be realized by other correspondence relationships. Moreover, the selecting process operation by the selecting unit 16 is not limited to the operation table shown in the table 4, but may be carried out in accordance with other selecting rules. Furthermore, both the smoothing process operation and the area gradation process operation amy be carried out irrespective of the object tag, and then the respective image data may be synthesized with each other in the selecting unit 6.

Also, in accordance with the above-described embodiment, as the image inputted into the image processing apparatus, the gray scale image containing the 8-bit gradation information per 1 pixel is employed. Apparently, the gradation information par 1 pixel is not limited to 8 bits. In such a case that a color image containing a plurality of color components is employed as the input image instead of this gray scale image when the color image is inputted in the plane sequential input manner, the similar process operation to that of the above-described embodiment may be sequentially carried out with respect to each of color components. When the color image is inputted in the point sequential input manner, a plurality of the above-explained image processing apparatuses according to the embodiment may be connected in parallel to each other. A total number of these image processing apparatuses is equal to a total number of color components of this color image. Then, the respective color components of this color image may be processed in the parallel manner. Otherwise, all of these color components maybe processed in the parallel manner in each of the image processing units.

As previously described in detail, in accordance with the present invention, the control signal used to perform the image forming process operation may be produced based upon the optimum image data with respect to each of the objects contained in the input image. As a consequence, according to the present invention, the image qualities of the output document images containing various regions can be improved. For instance, the output document image can be formed without deteriorating the gradation characteristics of the photographic/graphics contained in the input image in such a manner that the contours of the characters/line drawings contained in this input image become smooth.

What is claimed is:

1. An image processing apparatus comprising:
an object tag producing unit for producing an object tag indicative of a sort of an object and a region of the object contained in an input image represented by an input image data;
an image converting unit for converting the input image data to produce converted image data; and
a control signal producing unit for inputting thereinto the object tag produced by said object tag producing unit, for selecting any one of the input image data and the converted image data produced by said image converting unit based upon the input object tag, and for producing a control signal used to perform an image forming process operation based on the selected image data, wherein the control signal producing unit produces the control signal based upon the input image data when the sort of object expressed by the inputted object tag is equal to the multi-valued character and a predetermined condition is satisfied.

2. The image processing apparatus as claimed in claim 1, wherein
said image converting unit performs a halftone screening operation with respect to the input image data to produce the converted image data.

3. The image processing apparatus as claimed in claim 1, wherein
said image converting unit performs a smoothing process operation with respect to the input image data to produce the converted image data.

4. The image processing apparatus as claimed in claim 1, further comprising:
an edge detecting unit for sensing an edge contained in the input image based upon the input image data, wherein
said control signal producing unit inputs thereinto the sensing result of said edge detecting unit, and selects one of the input image data and the converted image data produced by said image converting unit based upon both the sensing result and the input object tag.

5. The image processing apparatus as claimed in claim 1, further comprising:
an edge detecting unit for detecting an edge contained in the input image based on the input image data,
wherein
a detecting result of the edge detecting unit is inputted into the control signal producing unit; and
the control signal producing unit produces the control signal based on the input image data when the sort of object expressed by the input object tag is equal to a multi-valued character and the detecting result indicates the edge.

6. The image processing apparatus as claimed in claim 1, wherein
the control signal produced by said control signal producing unit corresponds to a control signal for controlling a light emitting element of an image forming apparatus for forming an image by emitting said light emitting element; and
the control signal contains at least one of a signal for controlling light emitting timing of said light emitting element and a signal for controlling a light emitting strength.

7. An image processing apparatus comprising:
an object tag producing for producing an object tag indicative of a sort of an object and a region of the object contained in an input image represented by an input image data;
a plurality of image converting units for converting the input image data to produce a plurality of converted image data; and
a control signal producing unit for inputting thereinto the object tag produced by said object tag producing unit, for selecting any one of the input image data and the plurality of converted image data produced by said plurality of image converting units based upon the input object tag, and for producing a control signal used to perform an image forming process operation based on the selected image data, wherein the control signal producing unit produces the control signal based upon the input image data when the sort of object expressed by the input object tag is equal to the multi-valued character and a predetermined condition is satisfied.

8. The image processing apparatus as claimed in claim 7, wherein said plurality of image converting units include:

a first image converting unit for performing a halftone screening operation with respect to the input image data to produce the converted image data; and a second image converting unit for performing a smoothing process operation with respect to the input image data to produce the converted image data.

9. The image processing apparatus as claimed in claim 7, further comprising:

an edge detecting unit for sensing an edge contained in the input image based upon the input image data; wherein said control signal producing unit inputs thereinto the sensing result of said edge detecting unit, and selects one of the input image data and the plurality of converted image data produced by said plurality of image converting units based upon both the sensing result and the input object tag.

10. The image processing apparatus as claimed in claim 7, further comprising:

an edge detecting unit for detecting an edge contained in the input image based on the input image data, wherein a detecting result of the edge detecting unit is inputted into the control signal producing unit; and the control signal producing unit produces the control signal based on the input image data when the sort of object expressed by the input object tag is equal to a multi-valued character and the detecting result indicates the edge.

11. The image processing apparatus as claimed in claim 7, wherein the control signal produced by said control signal producing unit corresponds to a control signal for controlling a light emitting element of an image forming apparatus for forming an image by emitting said light emitting element; and the control signal contains at least one of a signal for controlling light emitting timing of said light emitting element and a signal for controlling a light emitting strength.

12. An image processing method comprising:

an object tag producing step for producing an object tag indicative of a sort of an object and a region of the object contained in an input image expressed by an input image data;

an image converting step for converting the input image data to produce at least one converted image data; and a control signal producing step for selecting any one of the input image data and the at least one converted image data produced at said image converting step, and for producing a control signal used to perform an image forming process operation based upon the selected image data, wherein in said control signal producing step, when the sort of object expressed by the object tag produced in said object tag producing step is equal to a multi-valued character, the control signal is produced based upon the input image data.

13. The image processing method as claimed in claim 12, wherein in said image converting step, at least one converted image data is produced by performing a halftone screening operation with respect to the input image data.

14. The image processing method as claimed in claim 12, wherein in said image converting step, at least one converted image data is produced by performing a smoothing process operation with respect to the input image data.

15. The image processing method as claimed in claim 12, wherein in said image converting step, at least one converted image data is produced by executing a halftone screening operation with respect to the input image data, and at least one converted image data is produced by executing a smoothing process operation with respect to the input image data.

16. The image processing method as claimed in claim 12, further comprising:

an edge detecting step for sensing an edge contained in the input image in response to the input image data; and in said control signal producing step, a selection is made of one of the input image data and at least one converted image data produced in said image converting step based upon the sensing result obtained in said edge detecting step and the object tag produced at said object tag producing step.

17. The image processing method as claimed in claim 12, further comprising:

an edge detecting step for sensing an edge contained in the input image based on the input image data, wherein in said control signal producing step, if the sort of object expressed by the object tag produced in said object tag producing step is equal to a multi-valued character and the sensing result obtained in said edge detecting step corresponds to an edge portion, the control signal is produced based upon the input image data.

18. The image processing method as claimed in claim 12, wherein the control signal produced by said control signal producing step corresponds to a control signal for controlling a light emitting element of an image forming apparatus for forming an image by emitting said light emitting element; and the control signal contains at least one of a signal for controlling light emitting timing of said light emitting element and a signal for controlling a light emitting strength.

* * * * *